United States Patent
Endo

(10) Patent No.: US 9,268,425 B2
(45) Date of Patent: Feb. 23, 2016

(54) PORTABLE DEVICE, CONTROL METHOD THEREOF, AND RECORDING MEDIUM WHEREON PROGRAM IS RECORDED

(71) Applicant: KONAMI DIGITAL ENTERTAINMENT CO., LTD., Tokyo (JP)

(72) Inventor: Katsuyoshi Endo, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 188 days.

(21) Appl. No.: 14/052,219

(22) Filed: Oct. 11, 2013

(65) Prior Publication Data

US 2014/0098050 A1 Apr. 10, 2014

Related U.S. Application Data

(63) Continuation of application No. PCT/JP2012/055375, filed on Mar. 2, 2012.

(30) Foreign Application Priority Data

Apr. 14, 2011 (JP) .................................. 2011-090359

(51) Int. Cl.
*G09G 5/00* (2006.01)
*G06F 3/041* (2006.01)
(Continued)

(52) U.S. Cl.
CPC ............... *G06F 3/041* (2013.01); *G06F 1/169* (2013.01); *G06F 3/0487* (2013.01); *G06F 3/0488* (2013.01); *A63F 2300/1075* (2013.01); *A63F 2300/1093* (2013.01)

(58) Field of Classification Search
CPC ... G06F 3/017; G06F 3/03547; G06F 3/0488; G06F 2200/1637; G06F 2203/041
USPC ........................... 345/156, 169, 173; 455/566
See application file for complete search history.

(56) References Cited

U.S. PATENT DOCUMENTS

2007/0103454 A1* 5/2007 Elias ............................ 345/173
2010/0328209 A1 12/2010 Nakao

FOREIGN PATENT DOCUMENTS

| JP | 63-282524 A | 11/1988 |
| JP | 2000-278391 A | 10/2000 |

(Continued)

OTHER PUBLICATIONS

International Search Report of PCT/JP2012/055375, mailing date of Jun. 5, 2012.

(Continued)

*Primary Examiner* — Jennifer Nguyen
(74) *Attorney, Agent, or Firm* — Westerman, Hattori, Daniels & Adrian, LLP

(57) ABSTRACT

A portable device with a display unit and a rear surface input unit of a touch-input type including a state assessment unit which assesses that a position designation state is applied when detecting a state a contact object is kept contacting the rear surface input unit in a prescribed time or longer; an index display unit for displaying an index on the display unit, corresponding to a position of the contact object contacting the rear surface input unit; a provisionally determined position storage unit for storing in a storage device, an index position when the contact object is removed from the rear surface input unit as a provisionally determined position; and an input determination unit which makes a definite determination of an input at the provisionally determined position stored in the provisionally determined position storage unit based on a definite determination operation.

13 Claims, 24 Drawing Sheets

(51) Int. Cl.
*G06F 3/0487* (2013.01)
*G06F 3/0488* (2013.01)
*G06F 1/16* (2006.01)

(56) References Cited

FOREIGN PATENT DOCUMENTS

| JP | 2003-058316 A | 2/2003 |
|---|---|---|
| JP | 2007-043497 A | 2/2007 |
| JP | 2008-204275 A | 9/2008 |
| JP | 2009-193423 A | 8/2009 |
| JP | 2010-008790 A | 1/2010 |
| JP | 4569411 B2 | 10/2010 |
| JP | 4587616 B2 | 11/2010 |
| JP | 2011-053928 A | 3/2011 |
| WO | 2009/101665 A1 | 8/2009 |

OTHER PUBLICATIONS

Japanese Office Action mailed, May 29, 2012 in corresponding Japanese Application No. 2011-090359, with English translation.

* cited by examiner

PORTABLE DEVICE, CONTROL METHOD THEREOF, AND RECORDING MEDIUM WHEREON PROGRAM IS RECORDED

TECHNICAL FIELD

This application is based on Japanese Patent Application Serial No. 2011-090359, filed in the Japan Patent Office on Apr. 14, 2011, the contents of which are hereby incorporated by reference.

The present invention relates to a portable device with an input unit on the rear surface thereof, a control method thereof, a program and a recording medium having recorded thereon the program.

BACKGROUND ART

Among portable devices such as portable game devices, portable terminals, and the like, proposed is a portable device with a rear surface input system wherein an operational touch panel is set on the rear surface of the portable device, and a user can perform an input operation with a finger on the rear surface (see Japanese Laid-open Patent Publication No. 2000-278391, Japanese Patent No. 4569411, Japanese Patent No. 4587616). When adopting such rear surface input system, since it does not happen that a part of the display screen is covered by a finger in operation, the visibility of the display screen can be improved.

However, conventional portable devices with the rear surface input system have a problem in their operability because a user's finger is placed around the rear surface. That is, the user has difficulties in making the finger touch the intended position (coordinate) precisely on the rear surface of the device, and in making accurate input operations.

In order to improve the operability of the rear surface input, could be contrived such configurations as the rear surface input part configured with a transparent material, so that the user's finger placed around the rear surface of the device is seen through; with a sensor other than a touch panel, such as a camera, used in combination, so that the imaging of the finger is presented on the screen; or with a protruding object added onto the rear surface of the device, so that the tactile sense of the protrusion enables the user's finger to feel for the input position and to operate. However, such configurations would necessitate other technologies than the technology of a regular touch panel and would complicate the device. Moreover, the transparency of the device and the installation of a sensor would restrict the designing of the device, and since the foregoing configurations are realized by different technologies from hardware to hardware with no technological versatility, the manufacturing cost would increase.

Moreover, with a portable device, where operations are performed on the rear surface as the device is held by the user's hands, by jiggling or the like, an erroneous operation is likely to occur, such as pushing a wrong button. Specifically, a portable device can be used in cars or during walking; when a portable device is used under these circumstances which easily cause jiggling and the like, even if the transparency of the device or else is accommodated, an accurate input operation onto the rear surface would be difficult.

SUMMARY OF THE INVENTION

An object of this invention is to provide a portable device, a control method thereof, and a recording medium having recorded thereon a program, which avert erroneous operations caused by hand jiggling and the like and realize accurate rear surface input operations.

A portable device according to one aspect of the present invention is provided with a display unit and a rear surface input unit of a touch-input type disposed on a surface opposite an installation surface of the display unit, and comprises a state assessment unit which assesses that a position designation state is applied when detecting a state in which a contact object is kept contacting the rear surface input unit in a prescribed time or longer, or a state in which the contact object moves while maintaining contact with the rear surface input unit; an index display unit for displaying an index on the display unit, the index corresponding to a position of the contact object which is in contact with the rear surface input unit or which moves while contacting the rear surface input unit; a provisionally determined position storage unit for storing in a storage device, a position of the index at a time when the contact object is removed from the rear surface input unit as a provisionally determined position; and an input determination unit which makes a definite determination of an input at the provisionally determined position stored in the provisionally determined position storage unit based on a definite determination operation being prescribed by a contact of the contact object, the definite determination operation being subjected to an entire surface of the rear surface input unit.

A control method of a portable device according to another aspect of the present invention in which a computer controls the portable device provided with a display unit and a rear surface input unit of a touch-input type disposed on a surface opposite an installation surface of the display unit, the control method comprising: a state assessment step for causing the computer to assess that a position designation state applies when detecting a state in which a contact object is kept contacting the rear surface input unit in a prescribed time or longer, or a state in which the contact object moves while maintaining contact with the rear surface input unit; an index display step for causing the computer to display an index on the display unit, the index corresponding to a position of the contact object which is in contact with the rear surface input unit or which moves while contacting the rear surface input unit; a provisionally determined position storage step for causing the computer to store in a storage device, a position of the index at a time when the contact object is removed from the rear surface input unit as a provisionally determined position; and an input determination step for causing the computer to make a definite determination of an input at the provisionally determined position stored in the provisionally determined position storage step based on a definite determination operation being prescribed by a contact of the contact object, the definite determination operation being subjected to an entire surface of the rear surface input unit.

The portable device according to the present invention can also be realized by a computer, in that case, by causing the computer to function as the foregoing respective units, a program and a computer-readable storage medium having recorded thereon the program, that enable the foregoing game device by means of a computer would fall under the scope of the present invention.

The purpose, characteristics and advantages of the present invention become more evident by the detailed explanation and the attached diagrams below.

BEST MODE FOR CARRYING OUT THE INVENTION

In the following, a portable device, a control method thereof, a program, and a recording medium whereon program is recorded according to one embodiment of the present invention are described with reference to the accompanying drawings.

[Outline of Portable Device]

Figure 1:
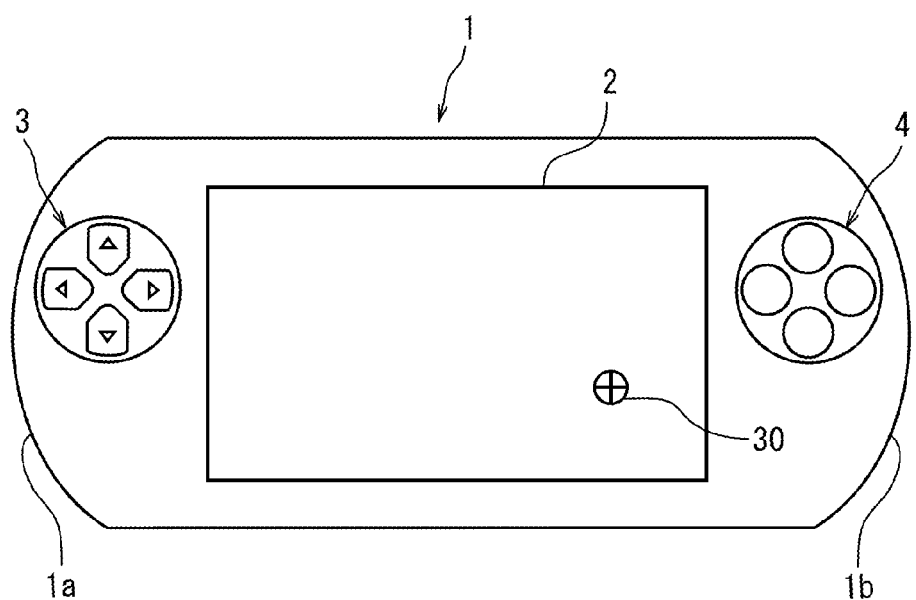
FIG. 1 is a configuration diagram showing the external appearance of the game device according to one embodiment of the present invention.
Figure 2:
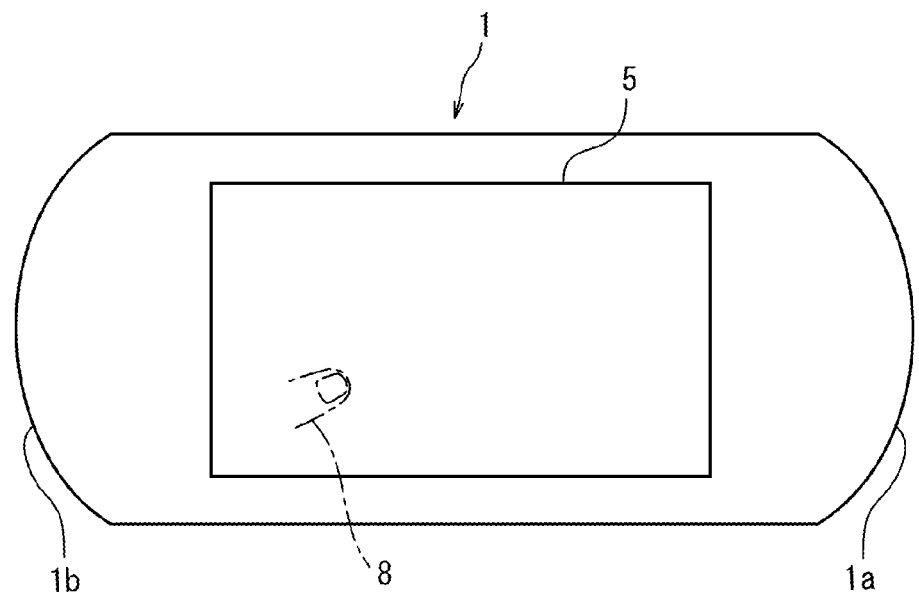
FIG. 2 is a rear surface diagram showing the external appearance of the game device.

The portable device according to an embodiment of the present invention has a display unit on the front surface side thereon; in addition, on the side opposite the installation surface of the display unit, a rear surface touch input unit is equipped. As an example of the present portable device, the portable game device 1 in FIG. 1 and FIG. 2 can be given. FIG. 1 is a configuration diagram showing an example of front surface side exterior appearance of the game device 1, and FIG. 2 is a rear surface diagram showing one example of the rear surface side exterior appearance of the game device 1.

As shown in FIG. 1, the game device 1 comprises on the front surface side, a display unit 2 of an Organic Electro-Luminescence, a Liquid Crystal and the like. As shown FIG. 2, the game device 1 further comprises on the rear surface, a rear surface touch panel 5 (a rear surface input unit by touch input system) which has almost the same surface area as the display unit 2. Basically, the display coordinate on the display unit 2 and the input coordinate of the rear surface touch panel 5 are in one-to-one correspondence; when a contact object such as the finger 8 of the player (user) touches the rear surface touch panel 5, on a position on the display unit 2 that corresponds to the foregoing contact coordinate, an index such as the cursor 30 is to be displayed. In other words, the position of the finger 8 in contact with the rear surface touch panel 5 is reflected on the position of the cursor 30 which is displayed on the front surface side display unit 2. Thus, the cursor 30 enables the user to perceive the contact position with the rear surface touch panel 5.

As stated above, in the case of portable devices, rear surface operations are executed as the user holds the device with the hand, which easily incurs erroneous operations by hand giggling and the like, and accurate rear surface input operations becomes difficult. However, the game device 1 according to an embodiment of the present invention enables, besides the one-touch rear surface input shown in FIG. 5A to 5C, the two-step rear surface input comprising the position designation operation for provisional determination and the definite determination operation, shown in FIG. 6A to 6C, thus realizing accurate rear surface input operations even under circumstances where hand-giggling and the like are prone to arise.

Figure 5A:
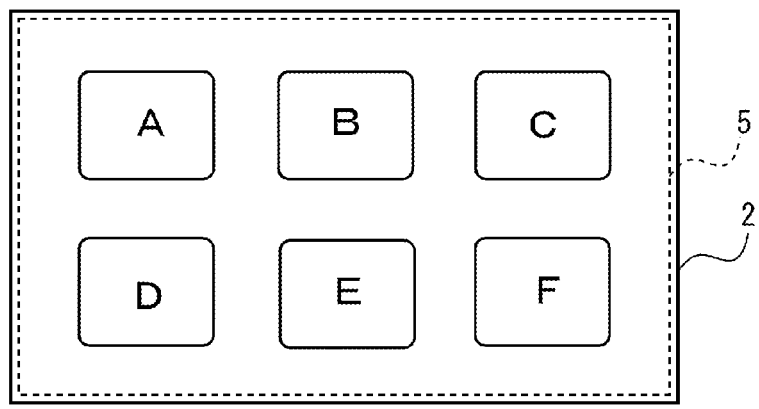
FIG. 5A is an explanatory diagram explaining an example of screen transitions at a one-touch rear surface input.
Figure 5B:
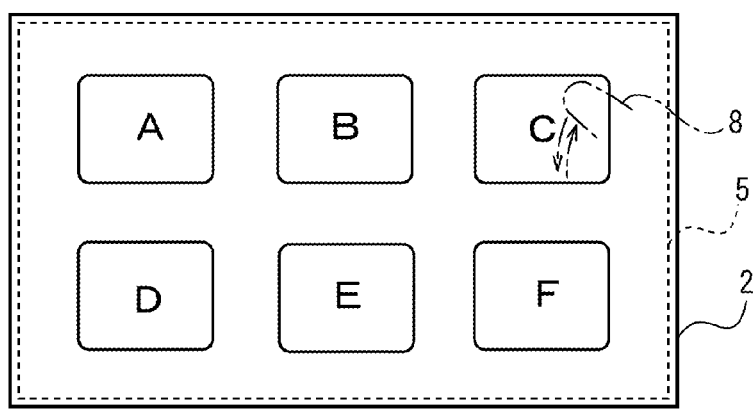
FIG. 5B is an explanatory diagram explaining an example of screen transitions at a one-touch rear surface input.
Figure 5C:
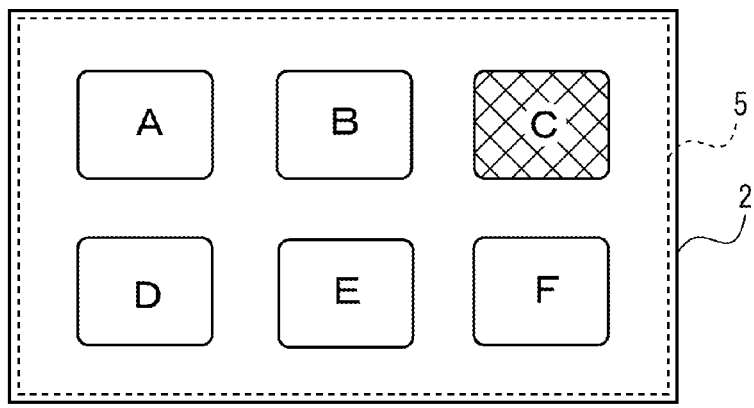
FIG. 5C is an explanatory diagram example of screen transitions at a one-touch rear surface input.

Specifically, as shown in FIG. 5A, for example, when the display unit 2 shows selectable buttons (objects) A to F, if the user presumes (or is confident) that there is no possibility of an erroneous button operation, then the user can, as shown in FIG. 5B, let his/her finger 8 touch the range on the rear surface touch panel 5 that corresponds to the button that the user would like to select, and then immediately removes the finger 8; whereby as shown in FIG. 5C, the corresponding button (in this example the button C) can be input with a one-touch.

Alternatively, under circumstances where hand-giggling and the like are easy to occur and rear surface input is difficult, the following two-step operation (1) and (2) is to be executed.

Figure 6A:
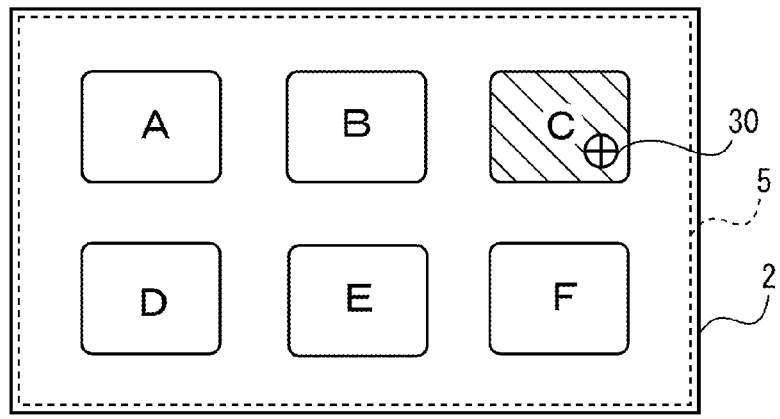
FIG. 6A is an explanatory diagram explaining an example of screen transitions at a two-step operation of provisional and of definite determination.
Figure 6B:
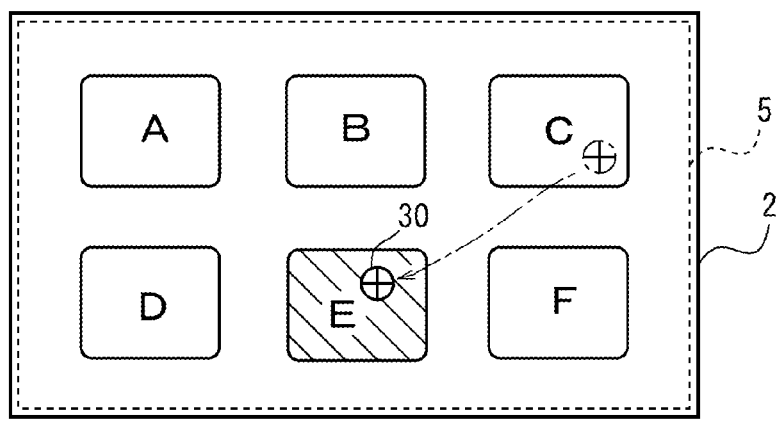
FIG. 6B is an explanatory diagram explaining an example of screen transitions at a two-step operation of provisional and of definite determination.

1) Instead of lifting the finger that touched the rear surface touch panel immediately after the contact, the finger is to be moved to the target button position, keeping contact with the rear surface touch panel 5, and to be removed for a moment at the target button position, thus making a position designation operation. With this operation, the selection of the target button is provisionally determined. In this operation, as shown in FIG. 6A, the cursor 30 which reflects the position of the finger that came in contact with the rear surface touch panel 5 is displayed on the display unit 2. Then, as shown in FIG. 6B, the user can make provisional determination by bringing his finger carefully, ascertaining that the cursor 30 moves corresponding to the movement of the finger in touch with the rear surface touch panel 5, to a position that corresponds to the target button (in this case the button E), and then by removing the finger at the position. Specifically, in this operation, unlike conventional one-touch input operations on a touch panel, in which the processing is triggered when a contact is made with the screen, the processing is triggered when the state of contact is cancelled. Thus, since the provisional determination is prescribed at the timing when the finger is removed, erroneous operations can be reduced to extremely few. This is because, specifically, in the cases of conventional touch panel input operations, naturally enough, the user's finger is drawn near toward the intended button and the like from a distant position from the screen, but because there is some distance between the finger and the button, by the time the finger eventually contacts the screen, the contact position can deviate from the intended button, and the finger can touch a different button than intended. Especially, portable devices are often operated while on board or on foot, under which circumstances there are more possibilities of position deviation caused by oscillation, hand giggling and the like. Moreover, since this operation is of higher degree of difficulty in operability because of the rear surface input, the operation of making the finger contact the intended button will be all the more difficult. In contrast, in the present operation, the finger is first brought in contact with the intended button, and at the timing when the finger is disengaged, the button is confirmed (provisionally determined); therefore, there is no possibility of suffering effects from oscillation and hand giggling, and the risk of erroneously pushing an unintended button is averted.

Figure 6C:
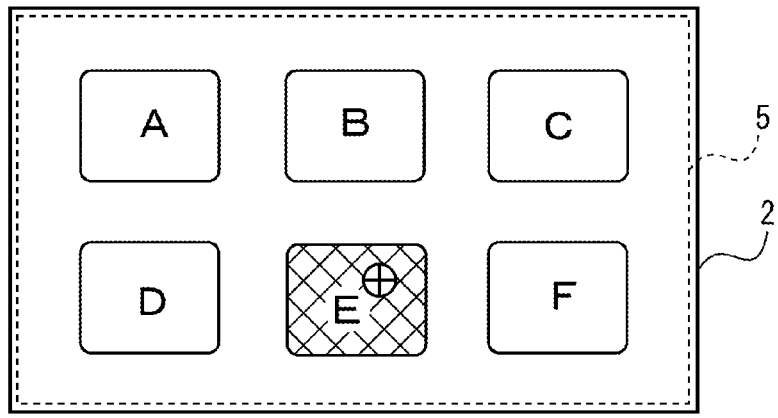
FIG. 6C is an explanatory diagram explaining an example of screen transitions at a two-step operation of provisional and of definite determination.

(2) After the above provisional determination, the user touches an arbitrary position in the rear surface touch panel 5 with his/her finger and executes a definite determination operation. Thereby, as shown in FIG. 6C, the button provisionally determined is definitely determined, and the button can be input accurately.

The configuration of the game device 1, according to this embodiment, with improved operability of rear surface inputs as described above, is now explained in detail.

[Configuration of Game Device]

As shown in FIG. 1 and FIG. 2, the left end 1a and right end 1b of the game device 1 is configured in arc-like shape; it is so configured that the player (user) can perform operations as he/she holds the device with his both hands, looking at the screen of the display unit 2. Specifically, with the display unit 2 in the center, on its right and left, the direction key 3 and the determination button 4, which are tangible operational buttons to be operated respectively with the right and left thumbs of the user, are provided. Incidentally, when the game device 1 is held by both hands, the middle and other fingers of the user are on the rear surface of the device, so that the user can make rear surface input operations touching the rear surface touch panel 5 with his fingers while looking at the screen of the display unit 2.

Note that by loading the touch interface on the screen of the display unit 2 additionally, thereby configuring the display unit 2 with a so-called touch screen, the touch input system can be used on both sides of the device, the front surface and the rear surface. Moreover, in the game device 1, can be installed tangible buttons and the like which are not illustrated in the diagram, such as an operation button, an analog pad, a volume adjustment button and so on, which can be operated with the right and left index fingers.

The rear surface touch panel 5 according to this embodiment is configured as a projection style, an electro-static capacity system multi-touch panel, which enables multipoint detection. Note that for the rear surface touch panel 5, touch panels according to other systems such as the resistance film system, the surface elastic wave system, infrared ray system, the electro-magnetic induction system, the surface type electro-static capacity system and so on can be adopted.

In the present embodiment, the area of the display domain (screen) of the display unit 2 is made almost the same as the area of the rear surface touch panel 5, thereby enabling the rear surface input using the rear surface touch panel 5 to the entire display domain (in FIG. 5A and the like, for the sake of simplicity, the rear surface touch panel 5 indicated by broken lines is presented slightly smaller than the display unit 2 which is shown with solid lines; nevertheless, the rear surface touch panel 5 and the display unit 2 are almost of the same area.). However, the present invention is not to be limited by this embodiment, and it is possible to make the area of the rear surface touch panel 5 smaller than that of the display unit 2, so that the rear surface input on the rear surface touch panel 5 can be made to a part of the entire display domain.

Figure 3:
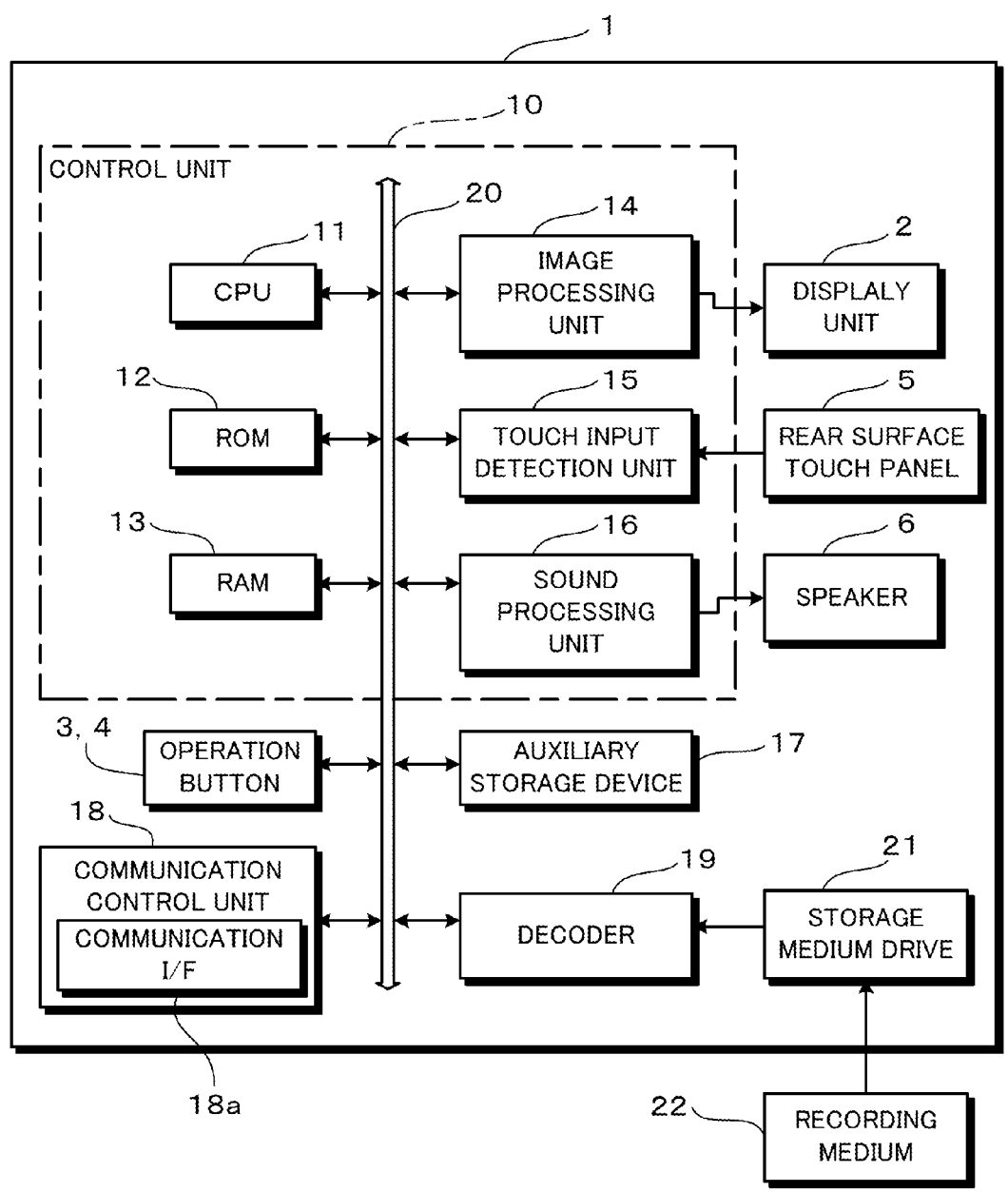
FIG. 3 is a block diagram showing an example of hardware configurations of the game device.

FIG. 3 is a block diagram showing the main hardware configuration of the game device 1. As shown in the present figure, the game device 1 comprises a control unit 10, an auxiliary storage device 17, a communication control unit 18, a decoder 19, a recording medium drive 21 and so on.

The control unit 10 comprises a CPU (Central Processing Unit) 11, a ROM (Read Only Memory) 12 and a RAM (Random Access Memory) 13 as the main storage device, an image processing unit 14, a touch input detection unit 15, and a sound processing unit 16, which are mutually connected through a bus line 20, which includes an address bus, a data bus, a control bus and so on. Note that there are interface circuits between the bus line 20 and each component, wherever necessary, but that here the illustration of the interface circuit is omitted.

The CPU 11 interprets and executes commands of the game program, and controls the game device 1 as a whole. The ROM 12 stores necessary programs and the like for basic performance and control of the game device 1. The RAM 13 stores each program and data, thereby procuring the work domain of the CPU 11.

The image processing unit 14 activates the display unit 2 on the basis of an image display command from the CPU 11, and displays the image on the screen of the display unit 2. In addition, the touch input detection unit 15, when a finger or the like comes in contact with the input screen of the rear surface touch panel 5, detects the contact position coordinate on the foregoing input screen and supplies the CPU 11 with the coordinate signal. Thereby, the contact position on the input screen of the rear surface touch panel 5 can be recognized by the CPU 11.

The sound processing unit 16, on the basis of sound production directions from the CPU 11, produces analog sound signals and outputs the signals to a speaker 6.

An auxiliary storage device 17 has non-volatile storage area in order to maintain the various game parameters and so on, at the time that the game is paused, such as pausing the game and retaining the status at the time the game is paused. Moreover, the auxiliary storage device 17 can store game programs and various data. As the auxiliary storage device 17, a removable medium drive such as a hard disk drive, a flash memory drive, a memory card or the like, for example, can be used.

The communication control unit 18 comprises a communication interface 18a, and has communication control functions to conduct data communications while the game is executed. Here, the communication control functions for the data communication include, for example, wireless LAN (Local Area Network) connection function, internet connection function by wireless LAN or mobile phone line network, NFC (Near Field Communication) function using a prescribed frequency band (for example, a frequency band of 2.4 GHz) and the like. The communication control unit 18, while transmitting the connection signal based on the command from the CPU 11 to connect the game device 1 to wireless LAN, to internet or the like, receives the information sent by the correspondent and supplies the information to the CPU 11.

The decoder 19 is connected to the recording medium drive 21. As the recording medium drive 21, for example, a DVD-ROM drive, a CD-ROM drive, a hard disk drive, an optical disk drive, a flexible disk drive, a silicon disk drive, a cassette medium reading machine or the like is used. Here, as a recording medium 22, a DVD-ROM, a CD-ROM, a hard disk, an optical disk, a flexible disk, a semiconductor memory, a cartridge style memory or the like is used. The recording medium drive 21 reads from the recording medium 22, the image data, sound data and program data, and supplies the decoder 19 with the read data. The decoder 19 performs error correction processing based on ECC (Error Correction Code) to data read by the recording medium drive 21, and supplies the data subject to the foregoing processing to the RAM 13.

Note that the game device 1 can also comprise an imaging device (camera) such as a CCD (Charge Coupled Device) image sensor or the like, a GPS (Global Positioning System) signal reception circuit, or a motion sensor (triaxial acceleration sensor or triaxial gyro scope) and so on.

In the game device 1 of the above configuration, the game program stored in the recording medium 22 or the auxiliary storage device 17 is loaded onto the RAM 13, and the loaded game program is executed at the CPU 11, thereby making the execution of various games possible. The user's operations to the game device 1 can be made by rear surface input using the rear surface touch panel 5 and the like.

[Functional Configuration of Game Device]

Figure 4:
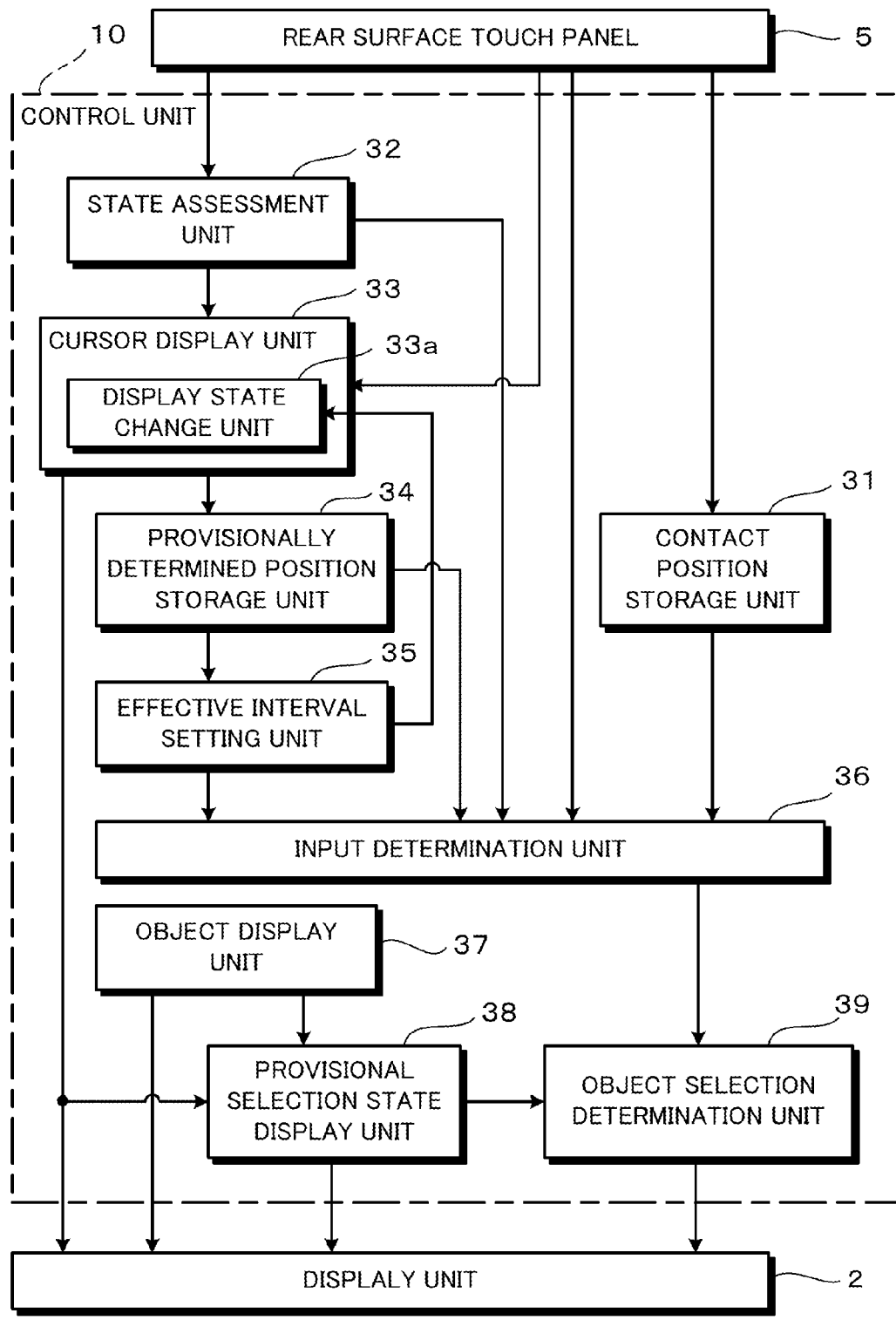
FIG. 4 is a functional block diagram showing an example of functional configurations of the game device.

The main functions of the game device 1 configured as described above are now explained. FIG. 4 is a main functional block diagram of the game device 1 shown in FIG. 1 to FIG. 3.

As shown in FIG. 4, the game device 1, functionally comprises a contact position storage unit 31, a state assessment unit 32, a cursor display unit (index display unit) 33, a provisionally determined position storage unit 34, an effective interval setting unit 35, an input determination unit 36, an object display unit 37, a provisional selection state display unit 38 and an object selection determination unit 39, each unit being realized by the control unit 10 executing the program.

The contact position storage unit 31 stores the contact position (contact coordinate) in the storage device (the RAM 13 and the like), when the user's finger (contact object) touches the rear surface touch panel 5. In other words, the contact position storage unit 31 stores the coordinate of the contact starting position, where the finger first came in contact with the rear surface touch panel 5, after the state of no contact object touching the rear surface.

Moreover, the contact position storage unit 31, while in the state wherein the finger is in continuous contact with the rear surface touch panel 5 (that is, during the operation of position designation for provisional determination), stores the coordinate of the contact position of the finger in contact with the rear surface touch panel 5 at the interval of prescribed duration (sampling time). As the contact position coordinate that the contact position storage unit 31 stores, only the coordinate of the most recent contact position can be sequentially overwritten and stored, or the coordinates of the contact positions at every sampling time can all be stored in time series.

The state assessment unit 32 has a function of assessing that a position designation state for provisional determination applies when a state is detected wherein a contact object such as a finger is in contact with the rear surface touch panel 5 continuously for a prescribed time or longer. The operation of position designation for provisional determination of the game device 1 is an operation of the user moving the finger, keeping contact with the rear surface touch panel 5, to an intended position over a certain amount of time, instead of the user removing the finger immediately after its contact with the rear surface touch panel 5. Therefore, by detecting the state wherein a finger is in contact with the rear surface touch panel continuously for a prescribed time or longer, the state assessment unit 32 can assess that the user has started the operation of position designation for provisional determination (that is, that the position designation state for provisional determination applies).

Another method to assess that a position designation state for provisional determination applies is to detect that the contact position coordinate changes while the finger keeps contact with the rear surface touch panel 5. Therefore, the state assessment unit 32 can assess that a position designation state applies when a state is detected wherein a contact object such as a finger moves keeping contact with the rear surface touch panel 5.

The cursor display unit 33 has a function of displaying the cursor 30 on the display unit 2 with the cursor corresponding to the position of the finger which is or moves in contact with the rear surface touch panel 5 while in the position designation state for provisional determination. Thus, during the position designation state for provisional determination, as the cursor 30 reflecting the position of the finger in contact with the rear surface touch panel 5 is displayed on the screen of the display unit 2, the user can operate on the rear surface while visibly recognizing the cursor 30 that coordinates with the finger movement. Thereby, without accompanying parallel usage of non-touch-panel sensors such as cameras, transparency of the device or device complication such as setting a protrusion on the rear surface, position designation by accurate rear surface operation becomes possible.

The provisionally determined position storage unit 34 has a function of storing in the memory device, the position of the cursor 30 at the time when the finger is removed from the rear surface touch panel 5 as a provisionally determined position. Specifically, in the position designation state, when the user, while visibly recognizing the cursor 30, removes the finger in contact with the rear surface touch panel 5 at the destination position, the position of the cursor 30 at that point is stored in the provisionally determined position storage unit 34 as the provisionally determined position.

The effective interval setting unit 35 sets an effective interval from the time a provisionally determined position is stored by the provisionally determined position storage unit 34 to the time the provisionally determined position is definitely determined. Only when the prescribed definite determination operation is made on the rear surface touch panel 5 within the effective interval, then the input at the provisionally determined position becomes a definite determination. Meanwhile, when a definite determination operation is not made within the effective interval, the cursor display unit 33 is configured to delete the cursor 30 displayed on the display unit 2. In other words, after the passage of an effective interval, the cursor 30 automatically disappears from the display unit 2, with the provisional determination cancelled. With this configuration, after the operation of provisional determination, when a definite determination is not made on the provisionally determined position, no specific cancellation operation is necessary, but the provisional determination is cancelled just by waiting for the effective interval to pass; thereby, the improved operability can be contrived.

Figure 7A:
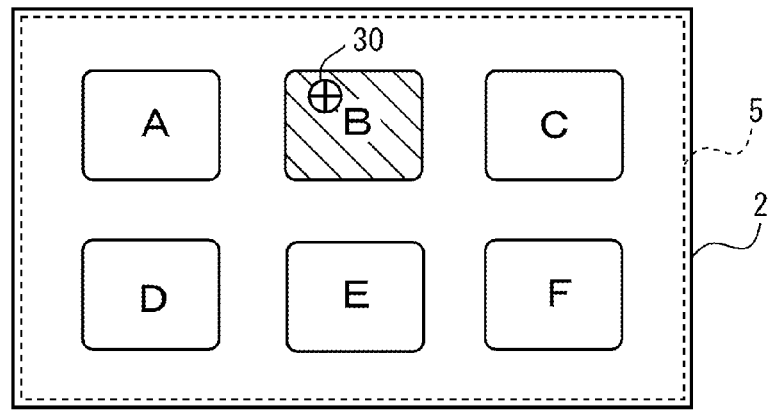
FIG. 7A is an explanatory diagram explaining an example in which a cursor display state changes according to the remaining time of the effective interval.
Figure 7B:
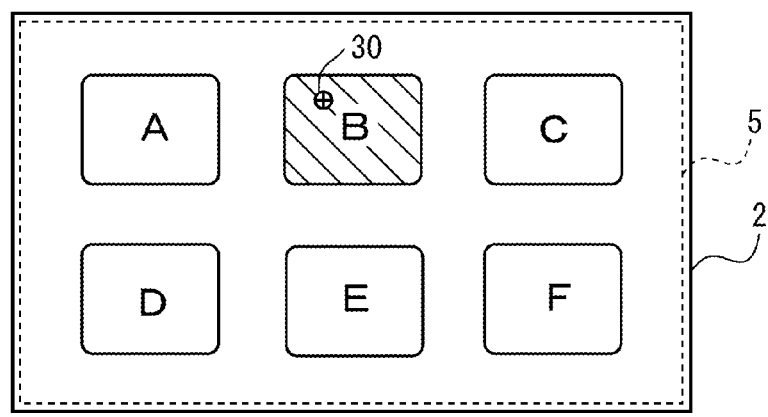
FIG. 7B is an explanatory diagram explaining an example in which a cursor display state changes according to the remaining time of the effective interval.
Figure 7C:
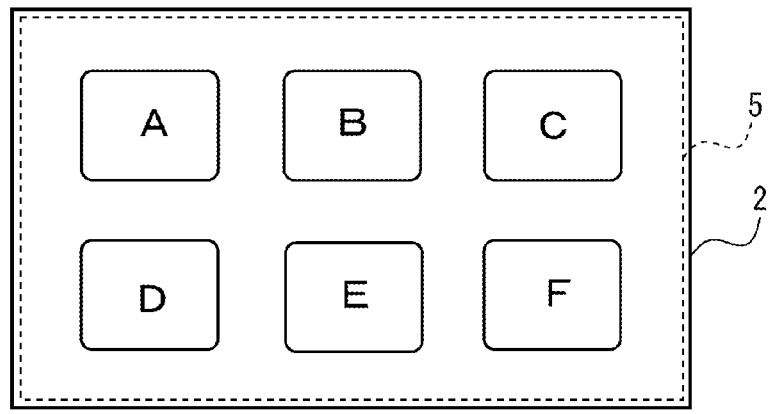
FIG. 7C is an explanatory diagram explaining an example in which a cursor display state changes according to the remaining time of the effective interval.

Moreover, the cursor display unit 33 comprises the display state change unit 33a (index display state change unit), which changes the visibility of the display state of the cursor 30 so that the visibility lowers as the remaining time of the effective interval for the provisionally determined position becomes shorter. FIG. 7A to 7C show how the area of the cursor 30 decreases as the remaining time of the effective interval becomes shorter, and how the cursor 30 is deleted with the elapse of the effective interval. Thus, the display state change unit 33a reduces the area of the cursor 30 as the remaining time of the effective interval becomes shorter. Otherwise, the display state change unit 33a can be configured so that the transparency rate of the cursor 30 increases as the remaining time of the effective interval decreases. Additionally, as long as the visibility of the cursor 30 gradually lowers, the embodiment is not limited to the above examples.

Thus, the display state change unit 33a notifies the user explicitly that the remaining time of the effective is decreasing, by reducing the area of the cursor 30 or raising the transparency of the foregoing cursor, as the remaining time of the effective interval becomes shorter. As the user executes the operations of provisional determination and the consequent definite determination while recognizing the cursor 30 on the display unit 2, by changing the display state of the cursor 30, the user is effectively given a realization of the remaining time of the effective interval.

As another method to notify the remaining time of the effective interval, for example, designed can be a method of raising the blink rate of the cursor 30 as the remaining time of the effective interval decreases. Alternatively, a method of changing the color of the cursor 30 in response to the remaining time of the effective interval (for example, to change the color of the cursor 30 from blue, yellow and then red, as the remaining time becomes shorter) can be contrived. Still another method can be contrived, of displaying in number counting down the remaining time of the effective interval, overlaying the cursor 30 or near the cursor 30. However, desirable is the configuration as in the present embodiment, of lowering the visibility of the display state of the cursor 30 as the remaining time of the effective interval becomes shorter and of the cursor 30, and of deleting the foregoing cursor at the elapse of the effective interval. With this configuration, not only the user is more explicitly informed that the remaining time of the effective interval becomes shorter, but deletion of the cursor 30 can be executed in a natural manner.

As an effective interval for a provisionally determined position, the setting can be a few seconds or so (for example, one to two seconds or so). Moreover, it can also be configured that the user can arbitrarily change the setting of the effective interval (for example, the arbitrary number of seconds can be designated from one to five) on an optional setting screen which is not shown in the foregoing figures.

Note that in the present embodiment, examples of setting an effective interval concerning the provisionally determined position are explained, while it can be configured that the definite determination operation can be received at any time without setting the foregoing effective interval. Here, when cancelling a provisional determination that is once made, a prescribed cancellation operation is to be executed. As the cancellation operation, desired are intuitively explicit operations, for example, an operation of moving the finger in contact with an arbitrary position of the rear surface touch panel 5 up and down or right and left, continuously more than one time (an operation with a movement as if rubbing an eraser), or the like.

The input determination unit 36, based on the definite determination operation after the provisional determination, definitely determines the input at the provisional determination stored in the provisionally determined position storage unit 34. Here, the definite determination operation is a prescribed operation with a contact of the contact object such as a finger, at any part of the entire surface of the rear surface touch panel 5. In the present embodiment, now explained is an example of one-touch operation (so-called "click" or "tap" operation, whereby this operation is henceforth named a "click operation") deemed as the definite determination operation, wherein after the finger comes in contact with the rear surface touch panel 5, the finger is removed before the conclusion of the predetermined interval, thereby releasing the contact status.

In the present embodiment, a one-touch input onto the rear surface as shown in FIG. 5A to FIG. 5C is, just the same as the definite determination operation, a click operation. The click operation executed before the transition into the position designation state for provisional determination is a one-touch input operation where the coordinate of the click position directly serves as the input coordinate, whereas the click operation made after a transition into the position designation state and following the provisional determination serves as the definite determination operation.

Moreover, the operation described above of position designation for provisional determination is, the operation of moving the finger keeping contact with the rear surface touch panel 5 to an intended position, which operation is so-called "drag"; thereby, this operation is henceforth called a "drag operation."

When detecting that the contact object such as a finger has been removed from the rear surface touch panel 5 without making a transition into the position designation state for provisional determination, the input determination unit 36, determines as the input position, the coordinate of the contact position when the finger (contact object) contacts the rear surface touch panel 5, which is stored in the contact position storage unit 31. Here, the foregoing situation where the finger has been removed from the rear surface touch panel 5 without making a transition into the position designation state unit indicates the situation where the finger has been removed from the rear surface touch panel 5 without making "the finger being in contact with the rear surface touch panel 5 for a prescribed time or longer" or without making "the finger being moved while contacting the rear surface touch panel 5". Namely, the foregoing situation indicates that a one-touch click operation has been performed by the user. Therefore, by detecting the situation where the contact object such as a finger has been removed from the rear surface touch panel 5 without making a transition into the position designation state, it is possible to detect that a one-touch rear surface input operation has been made. Therefore, when detecting the foregoing situation, the input determination unit 36 determines the coordinate of the contact position when the finger contacts the rear surface touch panel 5 as the input position.

Moreover, the input determination unit 36 has the function of making a definite determination of the input made at the provisionally determined position, only when a click operation as the definite determination operation is made within the effective interval set by the effective interval setting unit 35. If the effective interval passes after the provisional determination is made, the cursor 30 is deleted from the display unit 2 and the provisional determination is cancelled, so that the state goes back to the previous regular status before the transition into the position designation state. Therefore, when the click operation is made on the rear surface touch panel 5 after the passage of the effective interval, the input determination unit 36 detects that a finger has left the rear surface touch panel 5 without making a transition into the position designation state, and determines as the input position, the coordinate of the contact position when the finger contacts the rear surface touch panel 5.

The object display unit 37 displays on the display unit 2, objects that are selectable by a rear surface input operation. Here, objects that are selectable mean, objects to select from, such as buttons that are displayed on the screen of the display unit 2, as shown in FIG. 5A. For example, menu buttons in the initial screen displayed on the display unit 2 when the game device 1 is started are pertinent to the foregoing objects. Other selectable objects are various icons, characters and the like displayed on the display unit 2, and what is selectable by a rear surface input operation are also pertinent to the foregoing objects.

The provisional selection state display unit 38 has the function of displaying the display state of the selectable object, at the time when the selectable object is overlapped by the cursor 30, in a provisional selection state, in a different manner than the display state when the selection has been determined. For example, as shown in FIGS. 6A and 6B, in the position designation state for provisional determination, if the cursor 30, reflecting the position of the finger in touch with the rear surface touch panel 5, overlaps the button C or the button E, it is so configured that the color, the brightness, the print and the like are displayed in a different color, brightness, print and the like, than in the case of the button E having been selected, as shown in FIG. 6C. The provisional selection state display unit 38, in the position designation state for provisional determination, obtains the current location of the cursor 30; when the cursor coordinate obtained exists within the display area of a selectable object, the object is shown in the provisional selection state. Thus, in the position designation state, not only by displaying the cursor 30 reflecting the position of the finger on the screen of the display unit 2, but also by displaying in a visibly perceptible manner the provisional selection state of an object, further improvement of operability is enhanced.

The object selection determination unit 39, when the user makes the definite determination operation while an object is displayed in a provisional selection state, and thereby the input at the provisionally determined position is definitely determined by the input determination unit 36, definitely determines the selection of the object. For example, as shown in FIG. 6B, when the cursor 30 exists within the display range of the button E (when the button E is displayed in a provisional selection state), if the user removes the finger from the rear surface touch panel 5, makes provisional determination, then clicks on the rear surface touch panel 5 within the effective interval, thereby the input at the foregoing cursor position becomes definite, and the selection of the button E in the provisional selection state is made definite by the object selection determination unit 39.

[Operation of Game Device]

In the foregoing configuration, a basic operational example of the game device 1 according to an embodiment of the present invention is now explained with reference to the flowcharts of FIG. 8 and FIG. 9.

Foremost, as the game device 1 is started, an effective interval $T_{valid}$ is initialized (S1). Subsequently, it is determined whether the effective interval $T_{valid}$ is longer than 0 (S2), and in the case of YES at the foregoing S2, the effective interval $T_{valid}$ is decremented (S3), and the routine proceeds to S4. Note that it is only from when the provisional determination, to be described later, is made until when the definite determination is made that YES is determined at S2. Therefore, after the startup of the device and before the operation of provisional determination; even after the provisional determination, after the definite determination is made, or after the passage of the effective interval once set, the effective interval $T_{valid}$ is 0 (S2; NO). Thereby, the routine proceeds to S4 instead of S3. At S4, it is determined whether a contact object such as a finger touched the rear surface touch panel 5, and this routine of S2 to S4 is repeated based on loop processing, until contact is detected.

When a contact with the rear surface touch panel 5 is detected (S4; YES), the contact position storage unit 31 starts storing the contact coordinate (S5). Specifically, the contact position storage unit 31 stores the coordinate of the first contact position, where a finger (contact object) touched the rear surface touch panel 5, in the storage device (RAM 13 and the like); thereafter, at every interval of a prescribed sampling time, the foregoing storage unit obtains and stores the current contact coordinate.

Subsequently, as a contact time $T_{touch}$, a prescribed value (5 in FIG. 8) is set (S6), which is decremented until the contact time $T_{touch}$ becomes 0 (S7 and S8). These S6 to S8 are time lag processing (wait processing) of the prescribed time which serves as the reference to decide whether an operation is a click operation or a drag operation. The prescribed time is determined by the set value of the contact time $T_{touch}$ and the frequency of the operational clock of the CPU 11; for example, about the duration of 100 ms or so can be set.

Moreover, when the contact time $T_{touch}$ becomes 0 (S8; YES), it is determined whether the contact of the contact object with the rear surface touch panel 5 is continuing or not. Here, when a state is detected wherein a contact object such as a finger is in contact with the rear surface touch panel 5 continuously for a prescribed time or longer, in other words, when a drag operation is detected (S9; YES), the state assessment unit 32 assesses that the position designation state for provisional determination applies, thereby proceeds to position designation processing (S10). Meanwhile, when a state is detected wherein a contact object is removed from the rear surface touch panel before the prescribed time concludes, in other words, when a click operation is detected (S9; NO), the routine proceeds to S14 and starts the routine of a click operation. Note that the routine during the click operation is to be described.

Hereby, the operation during the position designation state (S10) is now explained with reference to the flowchart of FIG. 9.

When it is assessed that the position designation state applies, as described above, the cursor display unit 33 displays on the display unit 2, the cursor 30 corresponding to the position of the finger in contact with the rear surface touch panel 5 (S21). Subsequently, it is determined whether the cursor 30 overlaps any selectable object displayed on the screen of the display unit 2 (S22). For example, as shown in FIG. 6A, when the cursor 30 overlaps the display range of the button C, which is a selectable object, the provisional selection state display unit 38 displays the button C in a provisional selection state (S23).

After S23, or in the case of (S22: NO), it is determined whether the contact position of the finger with the rear surface touch panel 5 moved or not (in other words, if the finger moved by the drag operation or not) (S24). If the contact position of the finger has moved (S24: YES), the cursor display unit 33 moves the cursor 30 on the display unit 2 corresponding to the finger movement (S25). Consequently, after S25, or in the case of (S24: NO), the routine proceeds to S11 of FIG. 8.

In S11, it is determined whether the contact of the contact object with the rear surface touch panel 5 is continuing or not (in other words, whether the drag operation is continuing or not). Subsequently, while the drag operation in the position designation state is continuing (S11: YES), the process in the position designation state shown in the flowchart of FIG. 9 (S10) is repeated.

When the user removes the finger in the dragging operation from the rear surface touch panel 5, the contact with the rear surface touch panel 5 is cancelled (S11: NO), and the last coordinate during the drag operation (in other words, the position coordinate of the cursor 30 when the finger is removed from the rear surface touch panel 5) is stored by the provisionally determined position storage unit 34 as the provisionally determined position (S12). For example, as shown in FIG. 6, when the cursor 30 is within the display range of the button E and the user disengages the dragging finger off the rear surface touch panel 5, the position of the cursor 30 at that moment becomes the provisionally determined position, with the button E displayed in the provisional selection state and provisionally determined as an input candidate.

After the foregoing provisional determination, the effective interval setting unit 35 sets a prescribed value (100 in the example of FIG. 8) as the effective interval $T_{valid}$ to the provisionally determined position (S13). Here, the actual number of seconds of the effective interval is determined by the set value of the effective interval $T_{valid}$, and the frequency of the operational clock of the CPU 11. The routine after the setting of the effective interval $T_{valid}$ proceeds to the foregoing S2, and based on the loop processing of S2 to S4, the effective interval $T_{valid}$ is decremented until the finger touches the rear surface touch panel 5 (loop processing of S2: YES, S3: NO and S4: NO).

Here, discussed is the case of the click operation of the definite determination made by the user of an arbitrary position on the rear surface touch panel 5 before the effective interval $T_{valid}$ becomes 0. In this case, because after a finger touches the rear surface touch panel 5 (S4: YES), the routine proceeds through S5 to S7, and by the time the contact time $T_{touch}$ becomes 0 (S8: YES), the finger is off the rear surface touch panel 5 (S9: NO); therefore, the routine proceeds to S14. At S14, whether the effective interval $T_{valid}$ is longer than or equal to 0 is determined, but the click operation of the definite determination is made before the effective interval $T_{valid}$ becomes 0 (S14: YES), the routine proceeds to S15, where the last coordinate of the drag operation stored at S12 (in other words, the coordinate of the provisionally determined position) is determined as the input coordinate.

By the definite determination as described above, the provisional determination is cancelled for the better, thereby initializing the effective interval $T_{valid}$ (S16). Subsequently, the input operation at the input coordinate is executed (S17). For example, as shown in FIG. 6C, when the input of the button E is determined, the command corresponding to the foregoing button E is executed (for example, if the button E is the game start button, then the game is started.) Note that the cursor 30 does not move to the click position when the foregoing definite determination click operation is made. Incidentally, the cursor in FIG. 6C that is displayed overlaying the button E is configured to be deleted when effective interval $T_{valid}$ is initialized at S16.

Subsequently, the case of the click operation is discussed, wherein one-touch rear surface input is performed without going through provisional determination. In this case, the click operation is made with the effective interval $T_{valid}$ being 0, thereby the routine is determined as NO in S14 and the routine proceeds to S18. In S18, the first contact coordinate (in other words, the coordinate of the click position at the time when contact is made with the rear surface touch panel 5) stored in the foregoing S5 is determined as the input coordinate (S18). Consequently, the input processing at the input coordinate is executed (S17).

After S17, the routine proceeds to S2 again, repeating the foregoing processing of S2 to S18 while the game device 1 receives the rear surface input operations.

Figure 8:
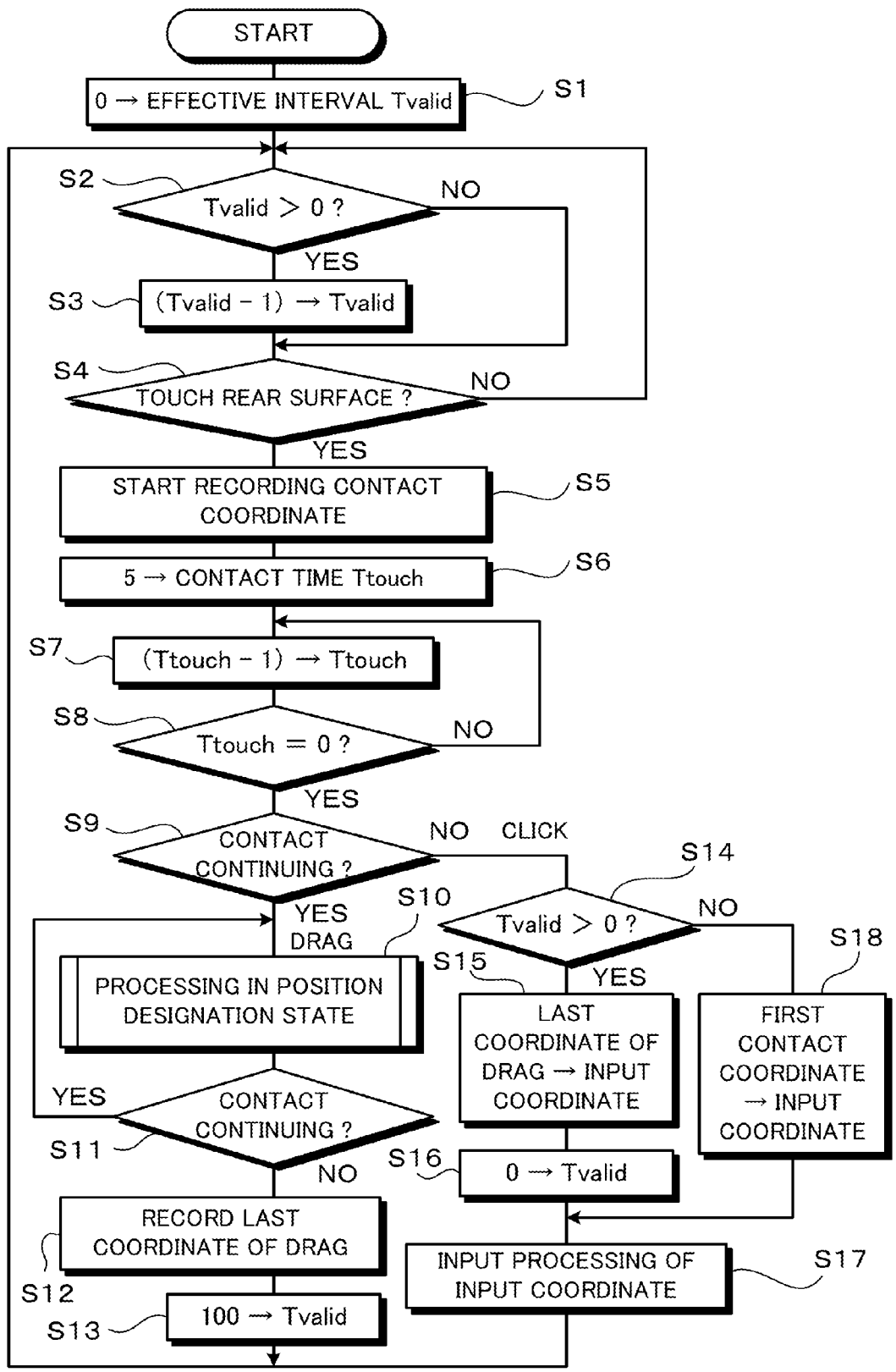
FIG. 8 is a flowchart showing an example of basic operations of the game device.
Figure 9:
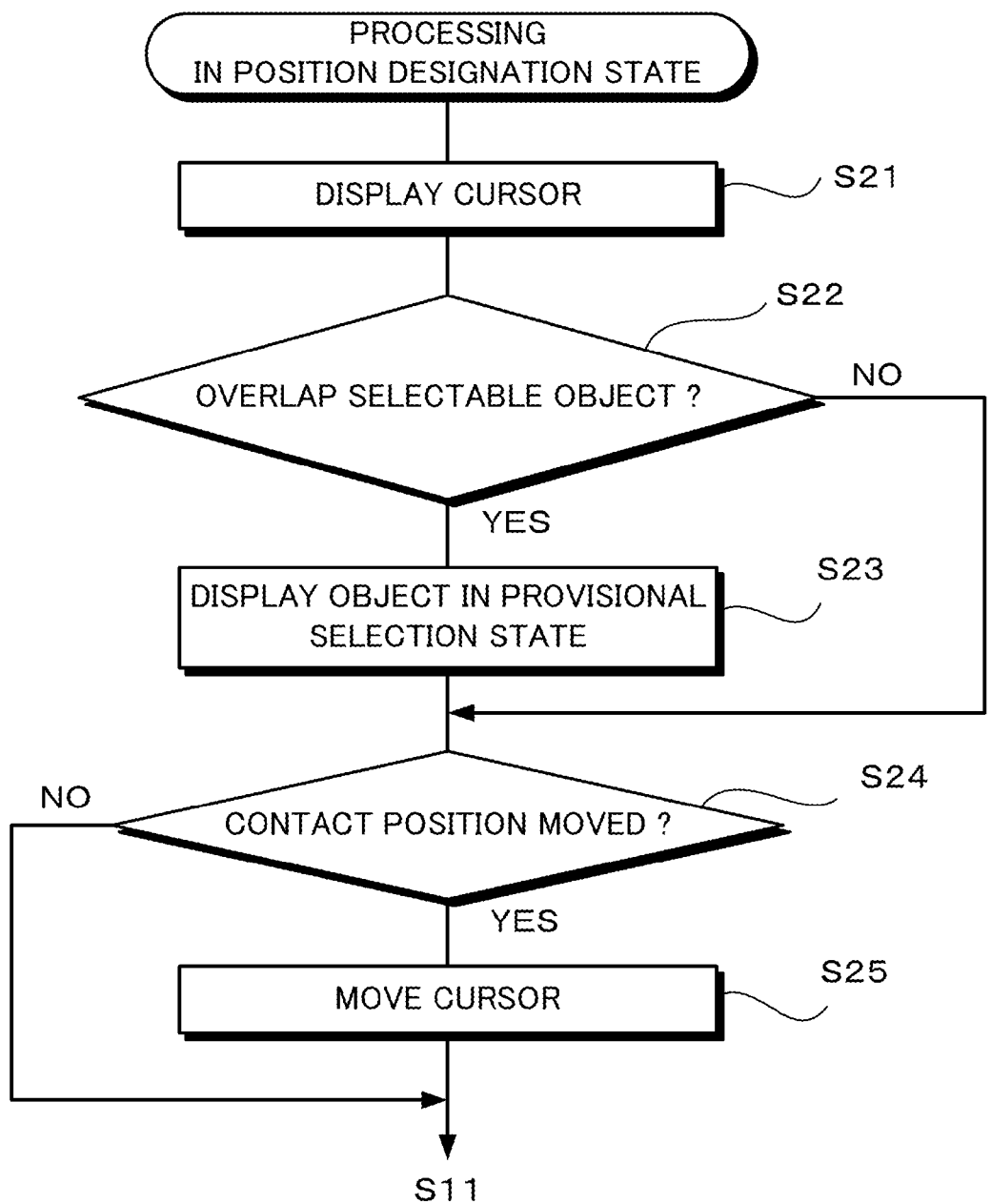
FIG. 9 is a flowchart showing an example of processing in the position determination state.
Figure 10:
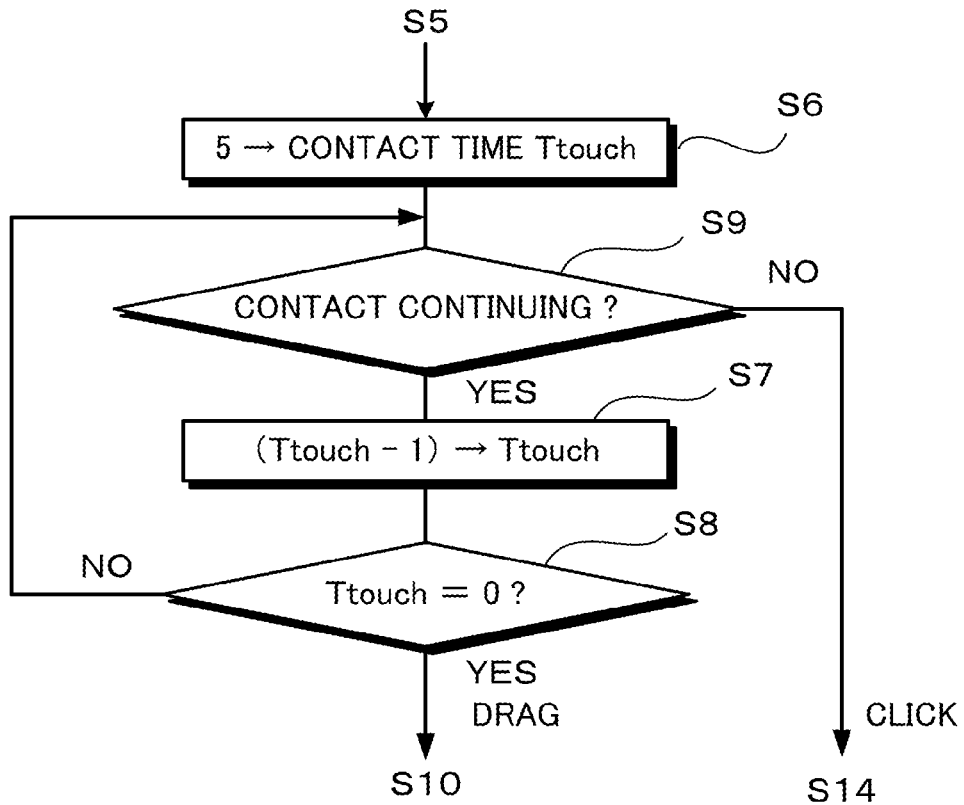
FIG. 10 is a flowchart showing an example of operations of the game device.

Incidentally, in the flowchart of FIG. 8, a processing example is explained, wherein in reference to the routine of S6 to S8, there is always a wait until the contact time $T_{touch}$ becomes 0 (S6 to S8). Then, whether the contact with the rear surface touch panel is continuing or not is decided (S9). Instead, as shown in the flowchart of FIG. 10, the processing of S9 to determine whether the contact is continuing or not can be executed before the processing of S8 wherein whether the contact time has become 0 is determined, and when the contact with the rear surface touch panel is canceled before the contact time $T_{touch}$ becomes 0 (S9: NO), an assessment can be made that a click operation has been performed, and the routine proceeds to S14. In addition, in the flowchart of FIG. 10, when the contact with the rear surface touch panel is continuing (S9: YES), and if the contact time $T_{touch}$ becomes 0 (S8: YES), an assessment is made that a drag operation is performed, and the routine proceeds to S10.

Figure 11:
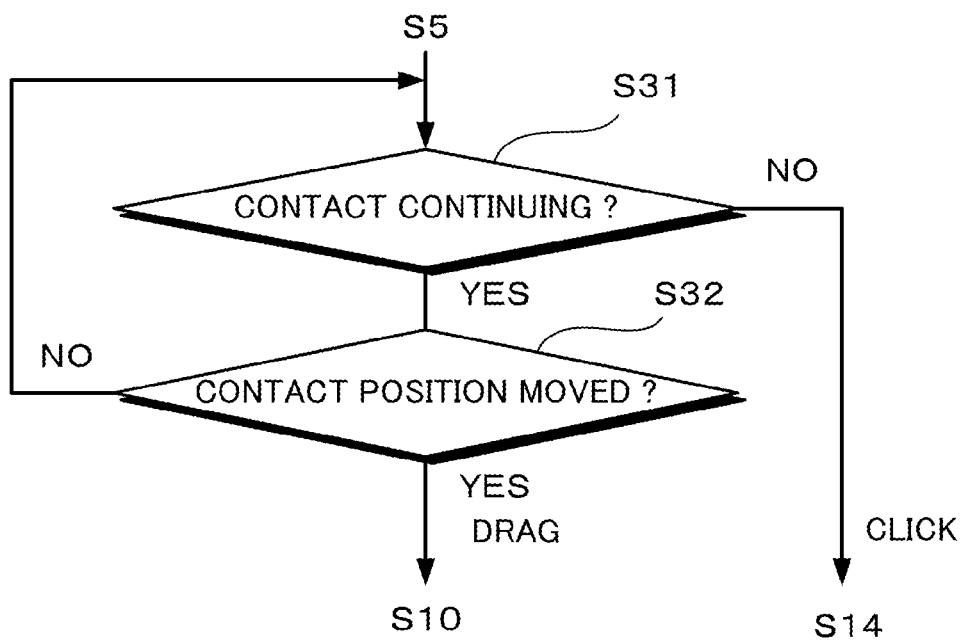
FIG. 11 is a flowchart showing other examples of operations of the game device.

Moreover, the flowcharts S6 to S9 in FIG. 8 and FIG. 10 is a processing to assess that the position designation state for provisional determination by drag operation applies when a state is detected wherein a contact object such as a finger is in contact with the rear surface touch panel 5 continuously for a prescribed time or longer. Instead, as shown in the flowchart of FIG. 11, when in the condition of the continuous contact with the rear surface touch panel 5 (S31: YES), a state is detected wherein the contact position with the rear surface touch panel 5 has been changed (S32: YES), an assessment can be made that the position designation state applies for provisional determination by a drag operation, and the routine proceeds to S10. In addition, in the flowchart of FIG. 11, if the contact position with the rear surface touch panel 5 does not move (S32: NO), and if the contact with the rear surface touch panel 5 is cancelled (S31: NO), an assessment is made that a click operation has been made, thereby the routine proceeding to S14.

As described above, the processing of S6 to S9 can be replaced by the processing described in the flowcharts of FIG. 10 or FIG. 11, which replacement, not limited with the process of S6 to S9, can be made with reference to all the flowcharts; whereby the explanation to the effect is henceforth to be omitted in the explanation using flowcharts.

Figure 12:
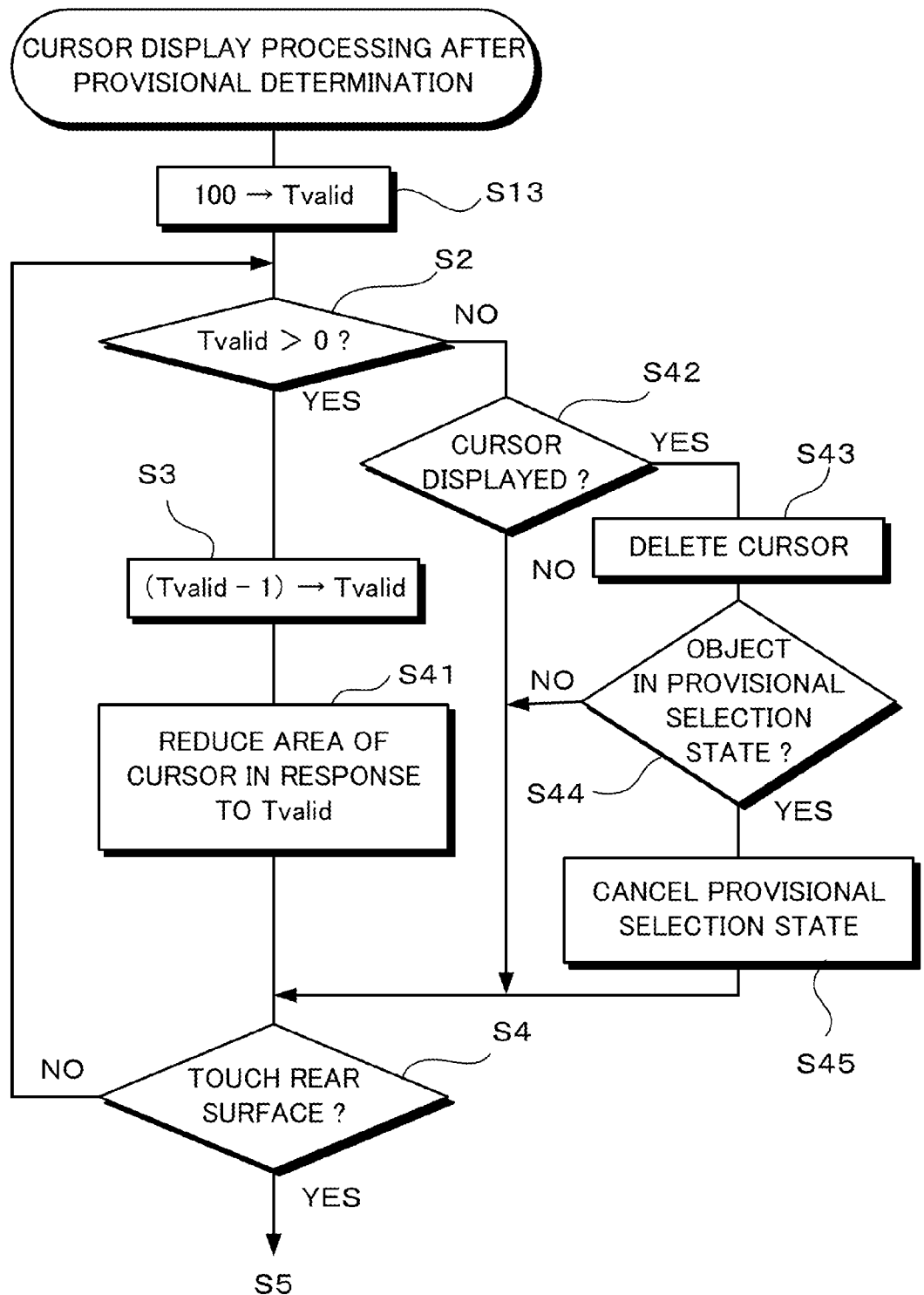
FIG. 12 is a flowchart showing an example of cursor display processing after provisional determination.

Subsequently, as a cursor display processing after the provisional determination, explained now is an example of the cursor 30 with its area reduced as the remaining time of the effective interval $T_{valid}$ becomes shorter, in reference to the flowchart of FIG. 12.

As described above, after the provisional determination, within the effective interval $T_{valid}$, a prescribed value (for example, 100) is set (S13), whereby if the effective interval $T_{valid}$ is not 0 (S2; YES), then the effective interval $T_{valid}$ is decremented by one $T_{valid}$ (S3). Subsequently, as the effective interval T becomes shorter, the cursor display unit 33 reduces the area of the cursor 30 in response to the corresponding effective interval $T_{valid}$ (S41). This process of reducing area is repeated until either the effective interval $T_{valid}$ reaches 0 (S2; NO), or the finger touches the rear surface touch panel 5 (S4; YES). Consequently, the cursor 30 displayed in the size shown in FIG. 7A immediately after the provisional determination, is displayed in a smaller size as shown in FIG. 7B.

In addition, when the effective interval $T_{valid}$ reaches 0 (S2: NO), if the cursor 30 is displayed (S42: YES) the cursor 30 is deleted (S43), whereas if the object is in the provisional selection state (S44: YES), the provisional selection state is also cancelled (S45). Thus, the provisionally determined state once set is automatically cancelled with the elapse of the effective interval $T_{valid}$, whereby the screen of the display unit 2 returns to the original display state where nothing is in contact with the rear surface touch panel 5.

Thus, with the passage of the effective interval $T_{valid}$, the provisional determination is automatically cancelled, while when cancelling the current provisional determination without waiting for the effective interval $T_{valid}$ pass and designating a new position coordinate as a provisionally determined position, the user can once again make a drag operation, instead of making a click operation for the definite determination. In other words, in the flowchart of FIG. 8, when there is some effective interval $T_{valid}$ left for the ongoing provisional determination and when a new drag operation is made, in S12, the information of the provisionally determined coordinate stored during the foregoing drag operation is overwritten by the last coordinate of the new drag operation, thereby a revision of provisional determination can be made. Consequently, after the provisional determination is revised, the effective interval is set at the prescribed value (100) (S13), and the interval starts from the beginning.

As described above, in S12 of the flowchart of FIG. 8, when the last coordinate to be stored during the drag operation (the provisionally determined position) is limited to the newest coordinate only, one position can be set as a provisionally determined position. On the contrary, two or more positions can also be set at the same time as the provisionally determined positions, when, as shown in the flowchart S12' of FIG. 13, a plurality of coordinates can be stored as the last coordinates of the drag operation stored by the provisionally determined position storage unit 34.

Figure 14A:
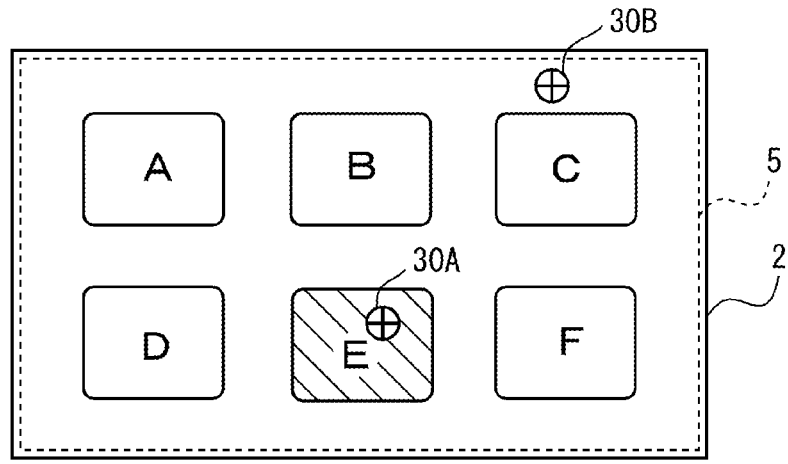
FIG. 14A is an explanatory diagram showing an example of operations to set a plurality of provisionally determined positions.
Figure 14B:
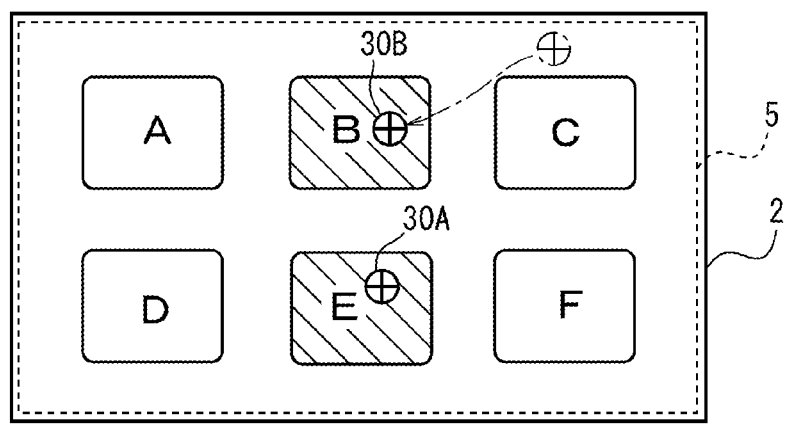
FIG. 14B is an explanatory diagram showing an example of operations to set a plurality of provisionally determined positions.
Figure 14C:
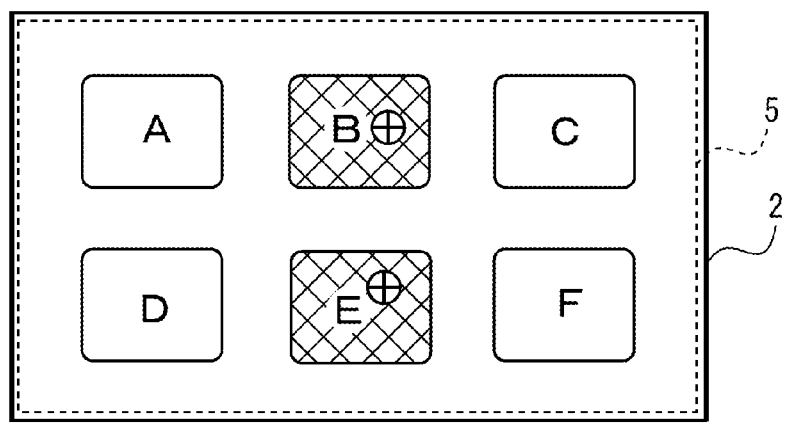
FIG. 14C is an explanatory diagram showing an example of operations to set a plurality of provisionally determined positions.

For example, as shown in FIG. 14A, after a user performing the drag operation removes the finger at the position where the cursor 30A exists over the button E, thus making the first provisional determination, if during the effective interval of the provisional determination the user starts further drag operation, then on the display unit 2 is displayed the cursor 30B, different from the cursor 30A. Subsequently, as shown in FIG. 14B, the user makes the second provisional determination, by drag operation, removing the finger at the position where the cursor 30B is over the button B. Thus, two provisional determinations are completed at the same time, and both the button B and the button C are displayed at the same time in the provisionally selected state. Consequently, if the user makes a click operation for the definite determination, within the effective interval set at the last provisional determination (in this case the second provisional determination), as shown in FIG. 14C, two provisional determinations become the definite determination inputs at the same time, which can realize the simultaneous selection input of the buttons B and C.

Similarly, by the user additionally performing drag operations for provisional determination within the effective interval set by the last provisional determination, provisionally determined positions that are simultaneously set can be further added. Moreover, these provisionally determined positions are definitely determined as a bundle, by one click operation of definite determination. This can be realized by a configuration wherein along with the provisionally determined position storage unit 34 storing one or a plurality of provisionally determined positions in the storage device, the input determination unit 36 definitely determines all at once the inputs at one or a plurality of provisionally determined positions stored in the provisionally determined position storage unit 34.

Incidentally, it can also be configured that even when the finger is removed during a drag operation of provisional determination from the rear surface touch panel 5 for a moment, because of the user suffering jolts (for example, the vehicle such as a bus shaking intensely), if the finger touches the rear surface touch panel 5 again within a prescribed time (for example, dozens of milliseconds or so) and the dragging continues, it is assessed that the dragging is continuing. This configuration is in order to avert the recording as a provisionally determined position of a position where the finger is removed from the rear surface touch panel 5 even for a moment, which recording would be due in the foregoing configuration where the provisionally determined position storage unit 34 can set more than one provisionally determined position by storing more than one provisionally determined position.

Figure 13:
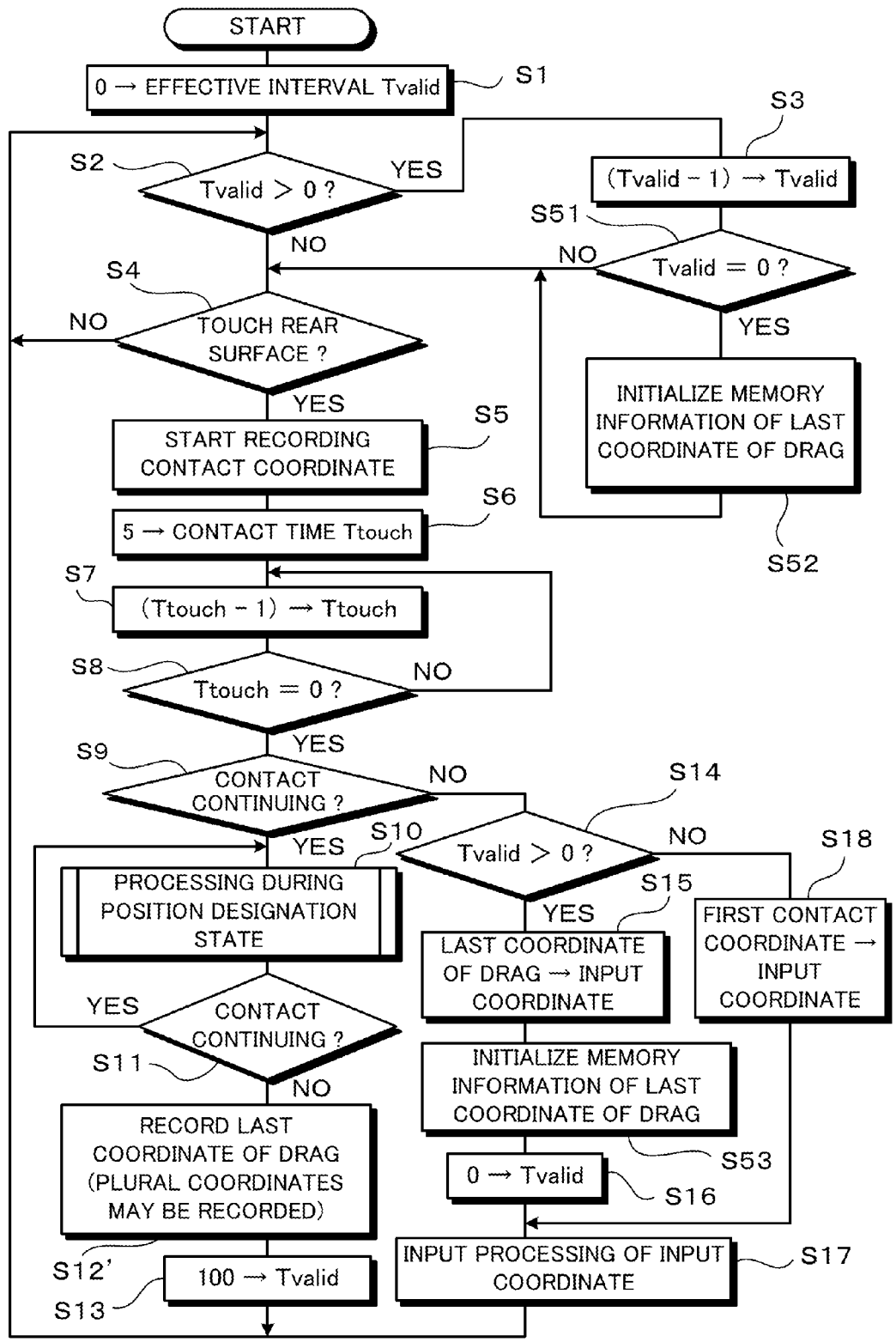
FIG. 13 is a flowchart showing other operation examples of the game device.

Moreover, the basic operation in enabling the setting of two or more provisionally determined positions is as shown in the flowchart of FIG. 13. The memory information of one or more provisionally determined positions (the last coordinates of dragging) stored by the provisionally determined position storage unit 34 at S12', when the effective interval $T_{valid}$ set at the last provisional determination reaches 0 (S51: YES), is initialized (S52); in addition, when the definite determination is made (S15), the initialization takes place (S53). In a configuration where one or more provisionally determined positions can be stored, when the memory was stored for ever, of the provisional determination position whose effective interval expired, or of the provisionally determined position whose definite determination has been made, these provisionally determined positions would also be definitely determined in vain; therefore, to avert such inconvenience, the processing S51 to S53 becomes necessary.

In other words, along with changing S12 of the basic flowchart of FIG. 8 to S12', just by adding S51 to S53 of FIG. 13 to the basic flowchart of FIG. 8, two or more provisional determinations can be set at the same time.

Subsequently, the operational method which, by an operation other than shown in FIG. 14A to FIG. 14C, enables the simultaneous selection and input of a plurality of buttons and other objects, is now explained, with reference to FIG. 15A to FIG. 15C.

Figure 15A:
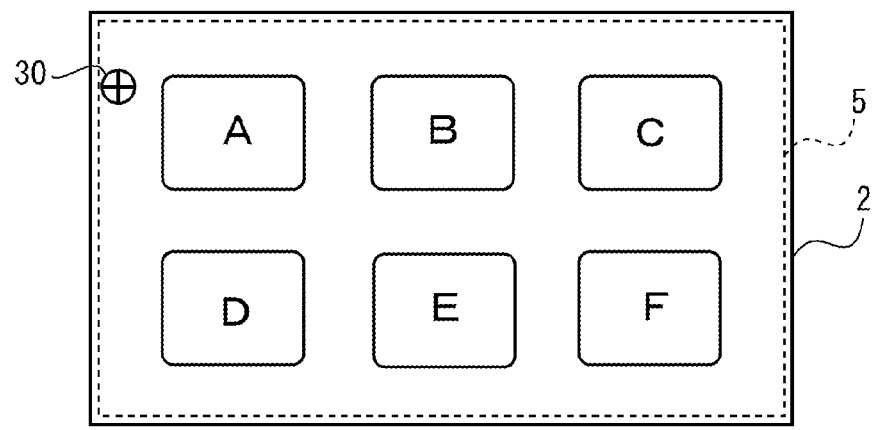
FIG. 15A is an explanatory diagram showing another example of operations to set a plurality of provisionally determined positions.

As shown in FIG. 15A, if the user starts the drag operation, touching the rear surface touch panel 5 with the finger, on the display unit 2, the cursor 30 reflecting the position of the finger is displayed. Thereupon, as shown in FIG. 15B, the user encloses one or more buttons (in this example, the buttons A and D) by the trajectory 50 of the cursor 30, which moves as the finger touching the rear surface touch panel 5 moves. Thereby, the button A and the button B, which exist in the range encircled by the trajectory 50 of the cursor 30, are displayed altogether in the provisional selection state. In this state, if the user removes the dragging finger from the rear surface touch panel 5, it is possible to provisionally determine the buttons A and D in a bundle. Thereafter, if the user performs the definite determination click operation, as shown in FIG. 15C, the simultaneous selection input of the buttons A and D can be realized.

To realize the bundle provisional selection and the bundle definite determination, which utilize the trajectory 50 of the cursor 30, it is configured that the provisional selection state display unit 38, during the position designation state for provisional determination, display one object or more (buttons, icons, characters or other selectable objects), which exist inside the area enclosed by the trajectory 50 of the cursor 30, in the provisionally determined state. Furthermore, it is configured that when one object or more are displayed in the provisional selection state, if an input is definitely determined by the input determination unit 36, the object selection determination unit 39 makes bundle determination of the provisional selection of one or more selectable objects.

Figure 16:
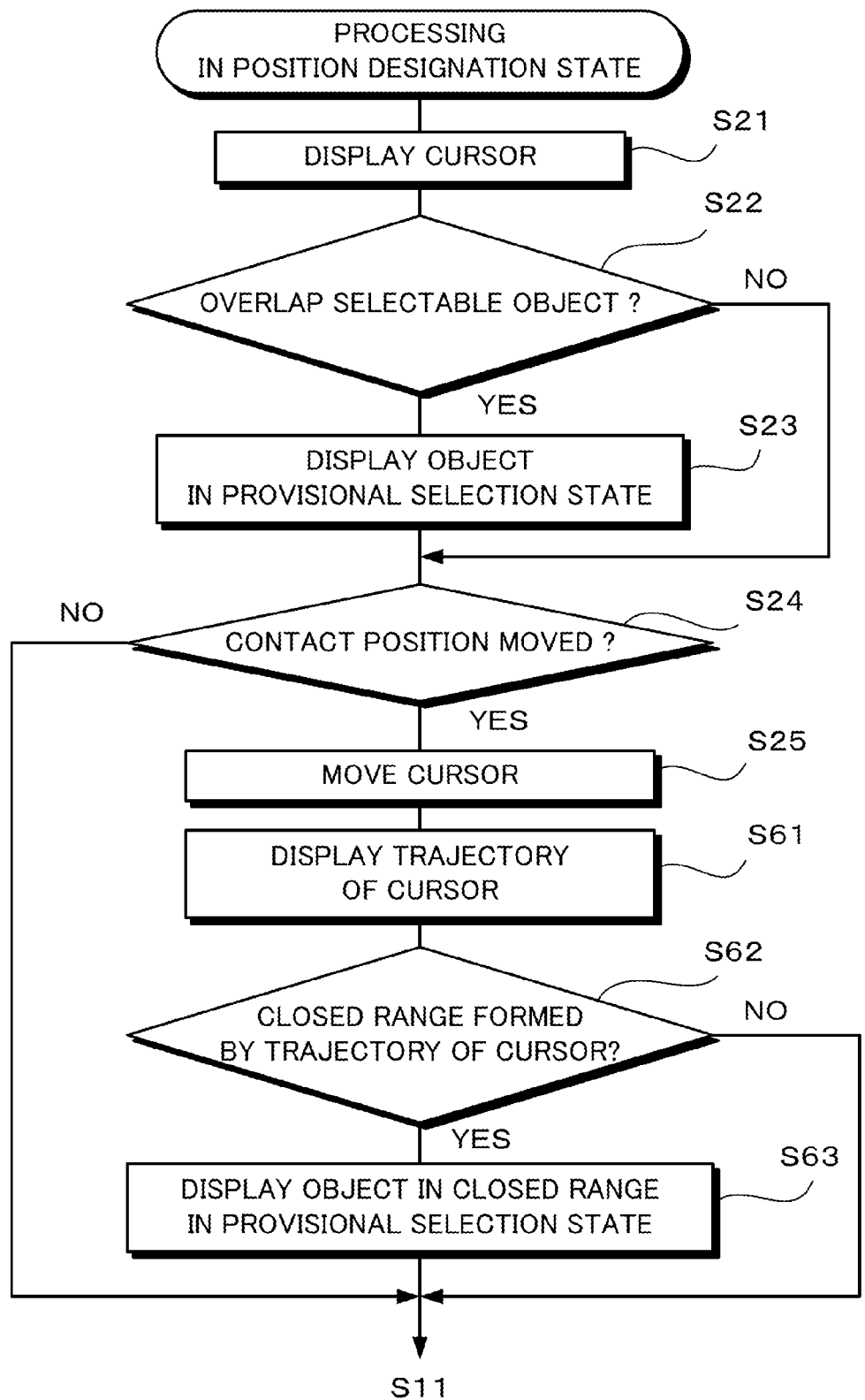
FIG. 16 is a flowchart showing other examples of processing in the position designation state.

Subsequently, the operation of the game device 1 which realizes the foregoing bundle provisional selection and bundle definite determination is explained. The foregoing bundle provisional selection and bundle definite determination can be realized by configuring the processing (S10) in the position designation state in the basic flowchart of FIG. 8 as the routine shown in the flowchart of FIG. 16. Note that the explanation of S21 to S25 of FIG. 16 is omitted because of similarity in processing with the flowchart of FIG. 9.

When the cursor 30 moves with the drag operation (S25), the cursor display unit 33 displays on the display unit 2, not only the cursor 30 but the trajectory 50 (S61). Note that the configuration of displaying the trajectory 50 is not indispensable but contributes to the improvement of operability, since the area enclosed by the trajectory 50 becomes clear on the screen.

Thereby, it is decided if a closed area has been formed by the trajectory 50 of the cursor 30 (S62). Here, the formation of a closed area unit, as shown in FIG. 15B, that by parts of the trajectory 50 crossing one another, an area enclosed by the trajectory 50 is formed. When a closed range is formed (S62: YES), the provisional selection state display unit 38 displays objects such as buttons that exist in the closed area in the provisional selection state (S63). After S63, or when S62 is NO, the routine proceeds to S11 in the flowchart FIG. 8.

By enabling operations of provisional selection and collective definite determination of one or more objects shown in FIG. 14A to FIG. 14C, or FIG. 15A to FIG. 15C, the operability in selecting a plurality of objects are greatly enhanced. Examples of selecting a plurality of objects are, other than selecting a plurality of buttons as described above, selecting a plurality characters or items on the screen where a game is being played. For example, on the screen of a baseball game, when selecting in a bundle a plurality of outfielder characters in position, moving the outfielder characters selected and adjusting their positions (for example, choosing three outfielder characters and moving them closer to the infield), the operations of multiple provisional determination and collective definite determination are beneficial. Moreover, in selecting on a soccer game screen a plurality of user characters collectively and in changing their formation, and in selecting on a shopping game screen a plurality of items collectively, the operations of multiple provisional determination and collective definite determination are effective.

As described above, in the game device 1 according to this embodiment, it is configured that the position designation (provisional determination) of the input coordinate is executed by the drag operation, and the subsequent click operation (definite determination operation) is an operation to confirm the user's resolution to input at the provisionally determined position. Thus, by separating the role of the two operations, a precise coordinate designation at the time of the click operation, due as a regular one-touch input operation, becomes unnecessary (freed from the concept of input determined by the contact coordinate at the time of a click).

The present game device 1, even when used under circumstances in cars and during walking, where shaking and hand giggling easily occurs, with the user having only to have a finger contact an arbitrary position on the rear surface touch panel 5, to move the finger maintaining the contact state, to carefully make the finger reach the destination position (the position of an object such as a button) visually recognizing the cursor 30 on the display unit 2, and at that position to remove the finger, thereby making provisional determination of the position, averts erroneous operations such as pushing an unintended button, and realizes accurate rear surface input.

Moreover, the game device 1 according to the present embodiment can realize accurate rear surface input by utilizing the regular rear surface touch panel 5, without parallel use of cameras or other sensors than touch panels, transparency of device or addition of protrusion on the rear surface; therefore, the present game device 1 incurs no rise of manufacturing cost by device complication.

Moreover, not only the operations of the position designation and of the definite determination, but also regular one-touch operation is possible; it is configured that the user uses flexibly these two rear surface input operations in answer to respective situations and environment of usage of the game device 1. For example, on the screen of the display unit 2, a relatively large button is displayed; in the case of a user operating the button indoors in a sedentary circumstance, instead of the provisional determination operation, a click operation as a regular one-touch input operation can be performed. Meanwhile, when a small button is displayed on the screen of the display unit 2, or when operations need to be made under circumstances described above where device oscillation, hand giggling and the like are prone to happen, the operations of provisional determination and definite determination can be performed, wherein careful and accurate input operations are possible.

[Another Configuration of Game Device]

Figure 17:
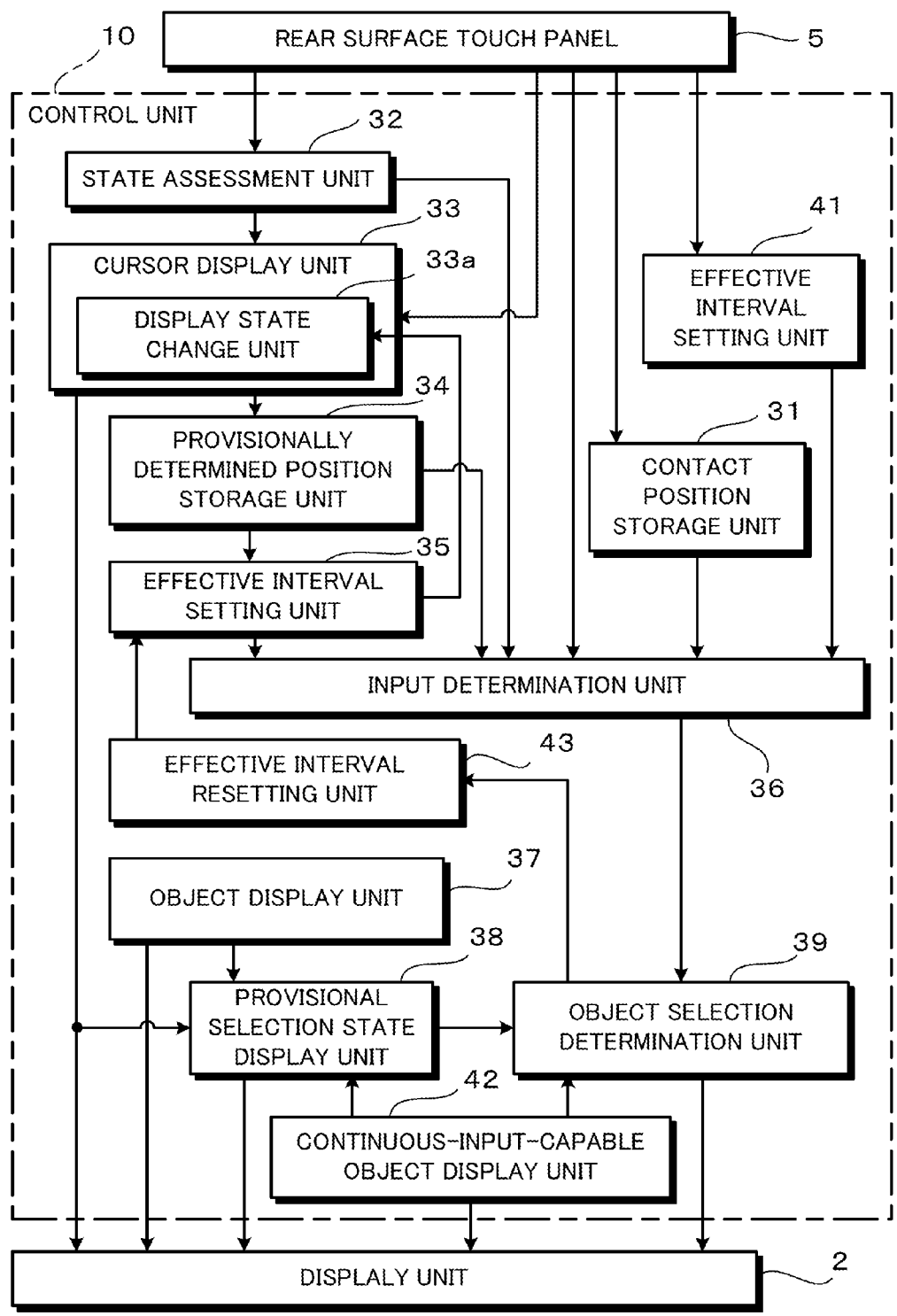
FIG. 17 is a functional block diagram showing another example of functional configurations of the game device.

Subsequently, another configuration example of the game device 1 is explained with reference to the functional block diagram of FIG. 17 and so on. Note that configurations of the like manner as shown in foregoing diagrams (FIG. 1 to FIG. 16) are introduced with the numbers of the corresponding member or step, with the explanations arbitrarily curtailed.

The control unit 10 of the game device 1, aside from respective units of 31 to 39 shown in FIG. 4, further comprises an effective interval setting unit 41, a continuous-input-capable object display unit 42 and an effective interval resetting unit 43. These units 41 to 43 are respectively realized by the control unit 10 executing the program.

Figure 18A:
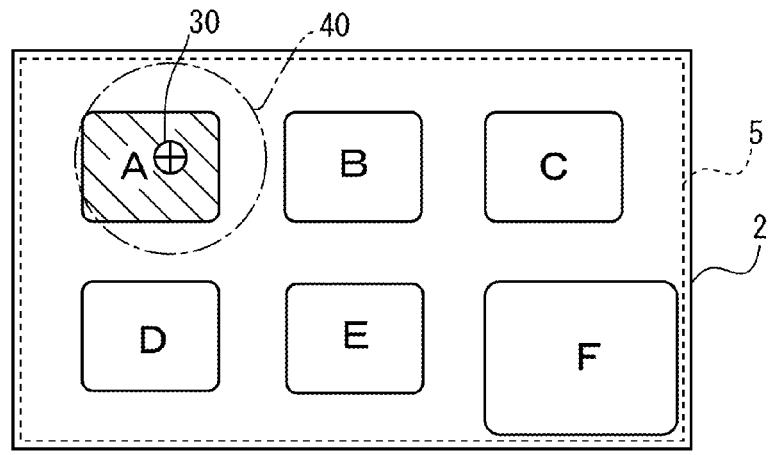
FIG. 18A is an explanatory diagram showing an example of operations when the effective area is set.

The effective interval setting unit 41, in the position designation state for provisional determination, has a function of setting on the rear surface touch panel 5, a prescribed effective area, the area including the position of the contact object such as a finger when the contact object is removed from the rear surface touch panel 5. For example, as shown in FIG. 18, when a user removes the finger from the rear surface touch panel 5 at the position where the cursor 30 is on the button A to make a provisional determination, the effective interval setting unit 41 sets the circular effective area 40 on the rear surface touch panel 5. Note that the effective area 40 has only to be a range that includes the position where the finger is removed, the position not necessarily having to be the center of the effective area. Moreover, the shape of the range is not to be restricted to a circular shape, but can be rectangular and the like.

When the effective area 40 is thus set by the effective interval setting unit 41, the input determination unit 36 makes definite determination of the input at the provisional determination position only when the definite determination operation (the operation of clicking on the rear surface touch panel 5) is made within the effective area. When a click operation as the definite determination operation is performed after the provisional determination, the click is usually given near the position where the finger is removed from the rear surface touch panel 5. Therefore, if the effective area 40 is set based on the position where the finger was removed from the rear surface, substantially there is no inconvenience in the definite determination operation.

Figure 18B:
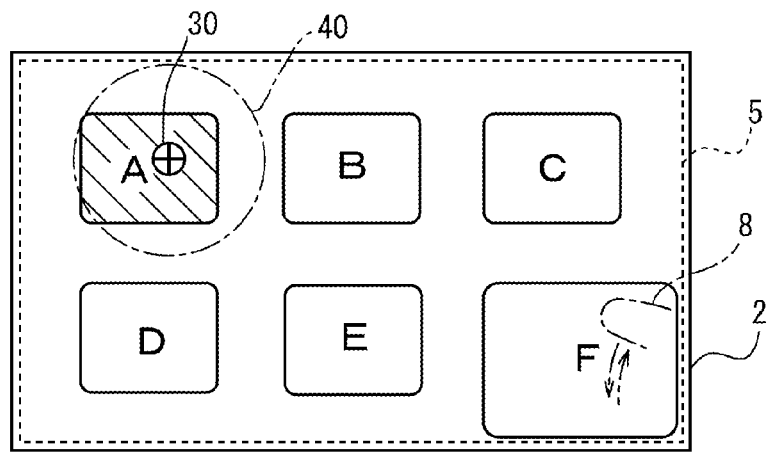
FIG. 18B is an explanatory diagram showing an example of operations when the effective area is set.
Figure 18C:
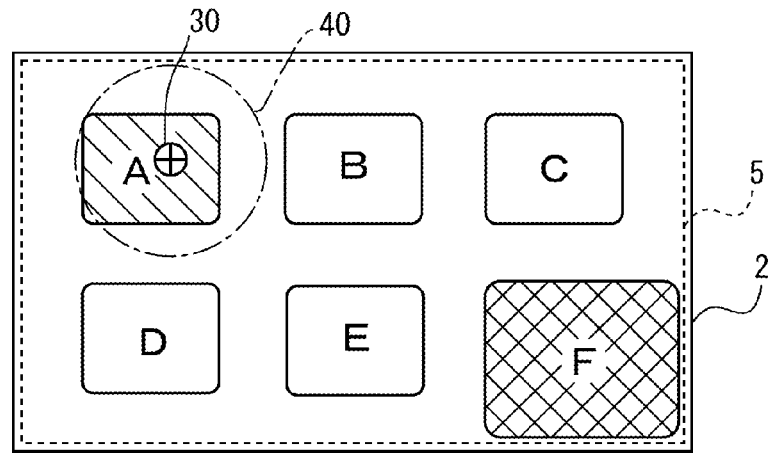
FIG. 18C is an explanatory diagram showing an example of operations when the effective area is set.

Moreover, the operation on the rear surface touch panel 5 performed outside the effective area 40 is not deemed the definite determination. Therefore, even after a provisional determination is made, arbitrary operations can be received outside the effective area 40. For example, as shown in FIG. 18B, when a click operation is made on a position outside the effective area 40 (in this example, the position corresponding to the button F) on the rear surface touch panel 5, the click operation is not deemed as the definite determination operation even though it is a click operation made after the provisional determination, but as a one-touch click operation of rear surface input. Therefore, in this case, as shown in FIG. 18C, the button F is to be selected and entered.

For example, when the foregoing button F is designated as a cancellation button, having a larger area than other buttons so that the one-touch rear surface input is easily made, by clicking the button F, the provisional determinations once set can be immediately cancelled any time without waiting for the effective interval to pass.

Figure 19:
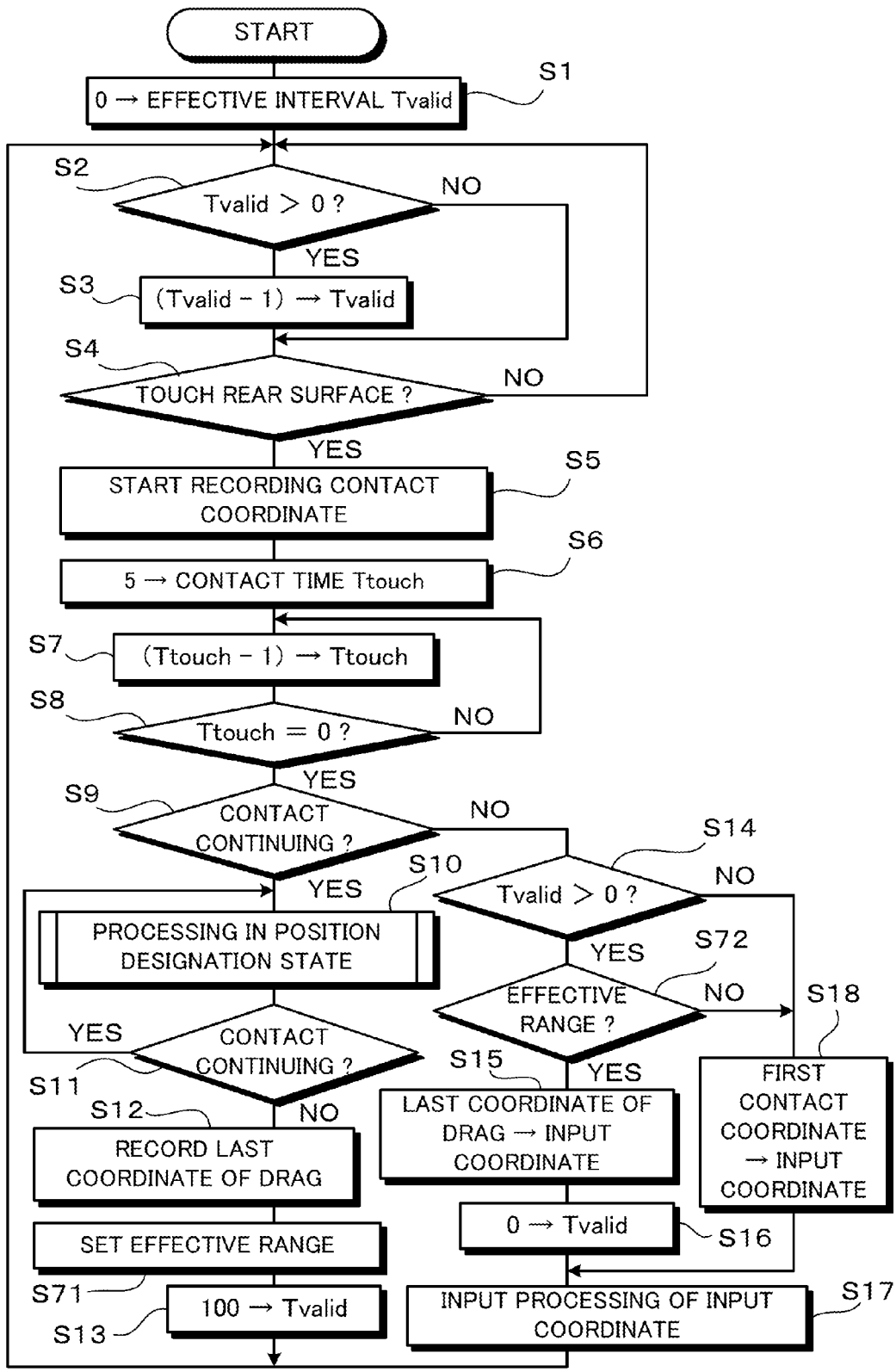
FIG. 19 is a flowchart showing other examples of operations of the game device.

As shown in the flowchart of FIG. 19, the operation of the game device 1 described above, to receive the definite determination operation only within the effective area, can be realized by adding to the basic flowchart of FIG. 8, the step S71 of setting the effective area and an assessing step S72 where the effective area or not branches operations.

Specifically, as shown in FIG. 19, when a provisional determination is made with the last coordinate of the dragging stored as the provisionally determined position (S12), the effective area is set (S71) with the site where the finger in the state of dragging is removed from the rear surface touch panel 5 as the center of the area. Moreover, for the provisionally determined position, a prescribed number (100) is set as the effective interval $T_{valid}$ (S13). Subsequently, if a click operation is performed on the rear surface touch panel 5 (S14: YES) before the effective interval $T_{valid}$ becomes 0, it is determined whether the contact coordinate of the click is within the effective area or not (S72). Here, if the contact coordinate made by the click is within the effective area (S72: YES), the click operation is deemed as the definite determination operation, and the last coordinate of dragging (in other words, the coordinate of the provisionally determined position) is definitely determined as the input coordinate (S15). Meanwhile, if the contact coordinate of a click is not within the effective area (S72: NO), the click operation is deemed not as the definite determination operation but as a one-touch input click operation. Therefore, the first contact coordinate stored in S5 (in other words, the coordinate of the click position when the contact was made with the rear surface touch panel 5) is determined as the input coordinate (S18).

Figure 20A:
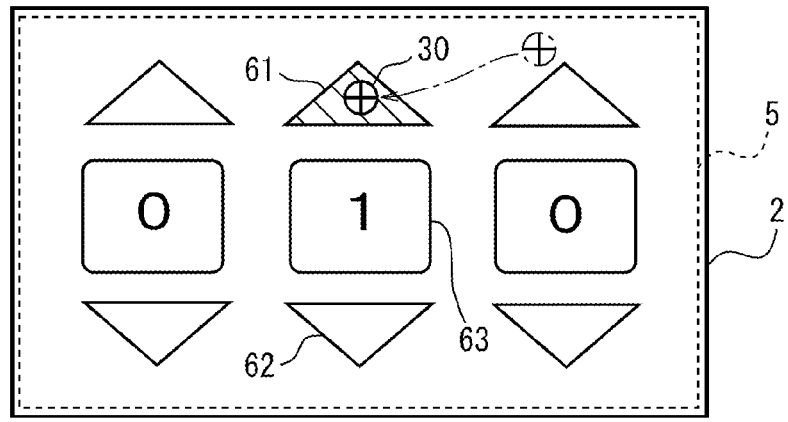
FIG. 20A is an explanatory diagram showing an example of operations of a continuous-input-capable object.
Figure 20B:
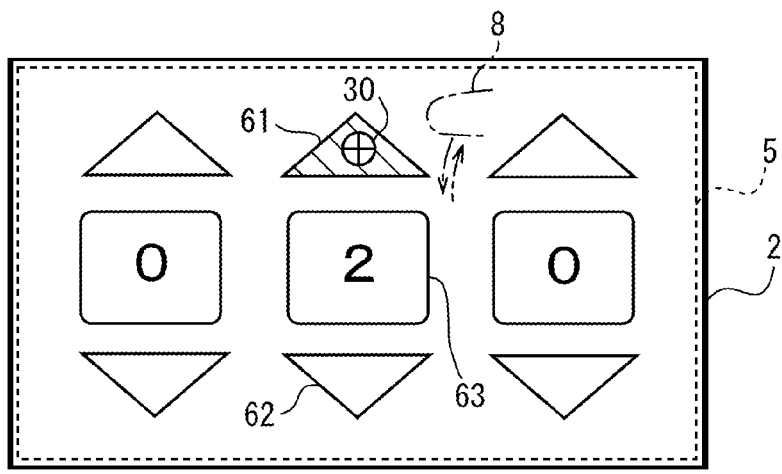
FIG. 20B is an explanatory diagram showing an example of operations of a continuous-input-capable object.
Figure 20C:
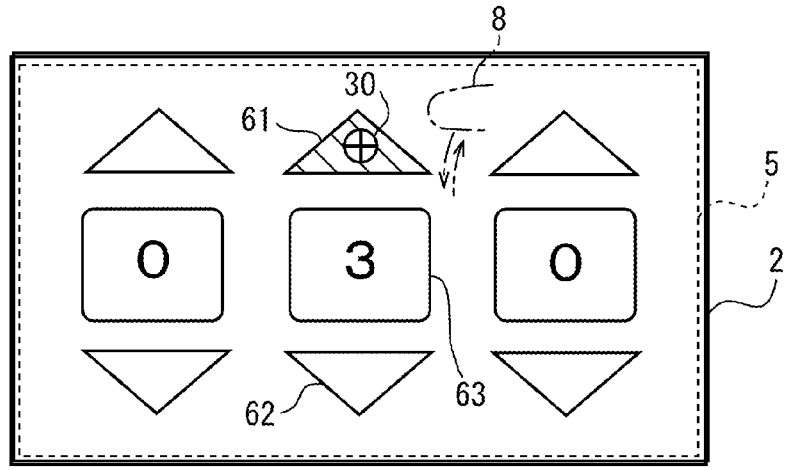
FIG. 20C is an explanatory diagram showing an example of operations of a continuous-input-capable object.

Moreover, the continuous-input-capable object display unit 42 displays on the display unit 2, a continuous-input-capable object which allows the definite determination input at the same provisionally determined position continuously. Here, given as examples of continuous-input-capable objects, as shown in FIG. 20A to FIG. 20C, are the ▲ button 61 (counting-up button), the ▼ button 62 (counting-down button) and the like, to alter changeable number (parameter), up or down. The ▲ button 61 is a button which raises the number in the number display unit 63 by one each time it is pushed, while the ▼ button 62 is a button which lowers the number in the number display unit 63 by one each time it is pushed. When an arbitrary number is set by using the ▲▼ buttons 61 and 62, often the same button is pushed many times in sequence. Therefore, instead of repeating provisional and definite determinations of the same button many times, by allowing the button which was once provisionally determined to make the definite determination continuously, operability can be pursued.

For example, as shown in FIG. 20A, when after the drag operation the user removes his finger at a position where the cursor 30 is over the ▲ button 61 and makes a provisional determination, the provisionally selected state applies to the ▲ button 61. Thereafter, if within the effective interval of the provisional determination, a definite determination is made with a click by the finger 8 of an arbitrary position on the rear surface touch panel 5, then as shown in FIG. 20B, the input of the ▲ button 61 is definitely determined; by the execution of the command prescribed for the push of the ▲ button 61, the number in the number display unit 63 is changed from "1" to "2". At this point, definite determinations in sequence of the same provisional determination position are allowed. Therefore, the effective interval of the provisional determination is reset, whereby the provisional selection state of the ▲ button 61 is maintained. If in this state the definite determination with the finger 8 is made of an arbitrary position on the rear surface touch panel 5, as shown in FIG. 20C, the input of the ▲ button 61 is definitely determined again, changing the number in the number display unit 63 from "2" to "3". After this definite determination, again, the effective interval of the provisional determination is reset, and the provisional selection state of the ▲ button 61 is maintained all the same. Thereafter, in the same manner, if the definite determination is made by a click on the rear surface touch panel 5 within the reset effective interval, accurate continuous input becomes possible of the ▲ button 61, once a provisional determination of the button made at the outset. Note that at the passage of the effective interval of the provisional determination, the cursor 30 is deleted and the provisional selection state of the ▲ button 61 is cancelled.

In order to realize the foregoing continuous input operation, the effective interval resetting unit 43, with a provisionally determined position in the display range of the continuous-input-capable object and when the click operation of the definite determination is performed within the effective interval, resets the effective interval for the provisionally determined position after the definite determination, and starts the effective interval from the beginning. Moreover, the input determination unit 36 once again makes definite determination of the input at the provisionally determined position when a click operation of the definite determination is made within the effective interval set by the effective interval resetting unit 43.

Figure 21:
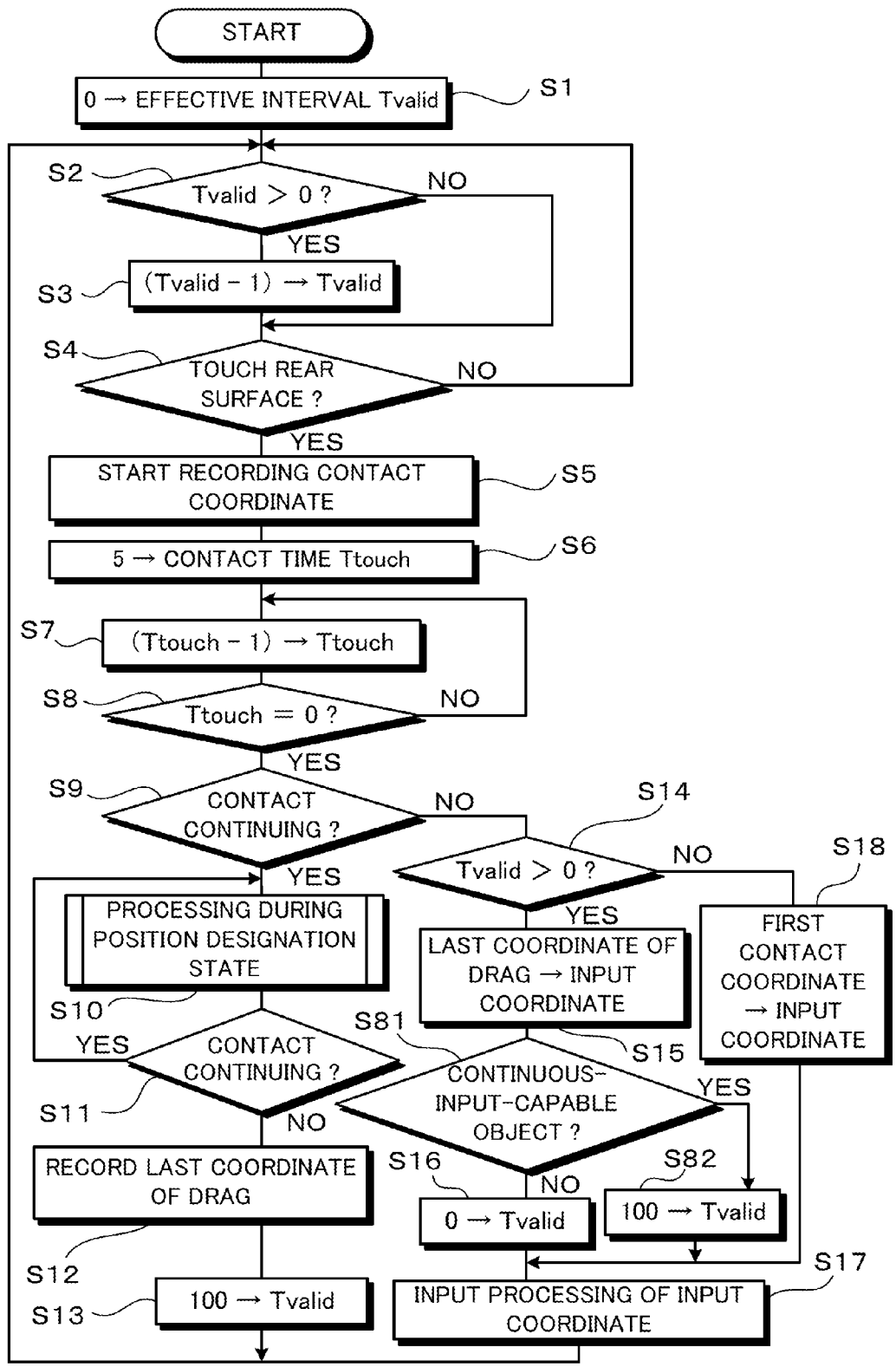
FIG. 21 is a flowchart showing other examples of operations of the game device.

As shown in the flowchart of FIG. 21, the operation of the game device 1 described above, that enables the input of definite determination in sequence of the same provisionally determined position can be realized by adding to the basic flowchart of FIG. 8, the assessing step S81 where the continuous-input-capable object or not branches operations, and the step S82 to reset the effective interval.

Specifically, as shown in FIG. 21, before the effective interval $T_{valid}$ becomes 0, the click operation of definite determination is performed to the rear surface touch panel 5 (S14: YES). Then, the last coordinate of the dragging (in other words, the coordinate of the provisionally determined position) is definitely determined as the input coordinate (S15). Thereafter, it is assessed whether the coordinate of the provisional determination exists inside the continuous-input-capable object display range or not (S81). Here, if the coordinate of the provisional determination exists inside the continuous-input-capable object display range (S81: YES), the effective interval $T_{valid}$ is set again at the prescribed value (100) (S82). Meanwhile, if the coordinate of the provisionally determined position does not exist inside the continuous-input-capable object display range (S81: NO), the effective interval $T_{valid}$ is initialized (S16).

Therefore, concerning the rear surface input of regular selectable objects, not the continuous-input-capable object, the provisional determination is cancelled by the definite determination after provisional determination, and click operations performed thereafter is processed as one-click input operations. Meanwhile, concerning the rear surface input of the continuous-input-capable object, one provisional determination enables continuous definite determination operations thereafter, thereby ensuring improvement in operability.

[Yet Another Configuration of Game Device]

Subsequently, explained is yet another configuration of the game device 1 with reference to the functional block diagram of FIG. 22, the diagrams of FIG. 23A to 23 C showing screen transitions, the flowchart of FIG. 24 and so on. Note that the configurations of the like manner as shown in foregoing diagrams (FIG. 1 to FIG. 21) are introduced with the numbers of the corresponding member or step, with the explanations arbitrarily curtailed.

The rear surface touch panel 5 of the game device 1 of the present embodiment is, for example, configured as an electrostatic capacity system multi touch screen, where multipoint simultaneous detection is possible. When the rear surface input unit is open to multipoint simultaneous detection, without removing one finger from the rear surface touch panel 5, another finger can perform prescribed operations (clicking and the like) on the rear surface touch panel 5. Utilizing the multipoint simultaneous detection function effectively, the present game device 1 realizes accurate rear surface input operations. Foremost, with reference to FIG. 23A to FIG. 23C, the summary of rear surface input operation according to the present embodiment is explained.

Figure 23A:
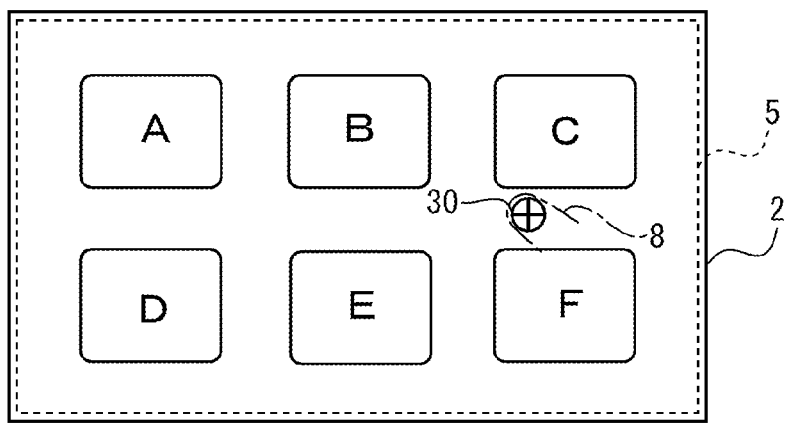
FIG. 23A is an explanatory diagram showing an example of rear surface input operations by a user using a finger of each hand.
Figure 23B:
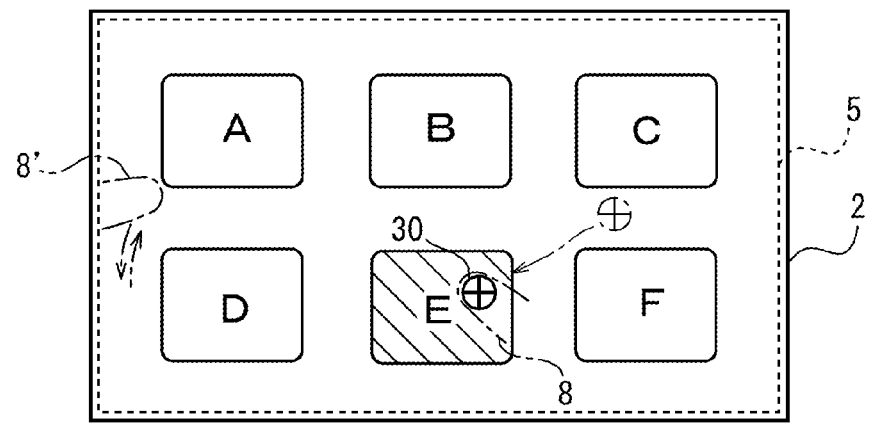
FIG. 23B is an explanatory diagram showing an example of rear surface input operations by a user using a finger of each hand.
Figure 23C:
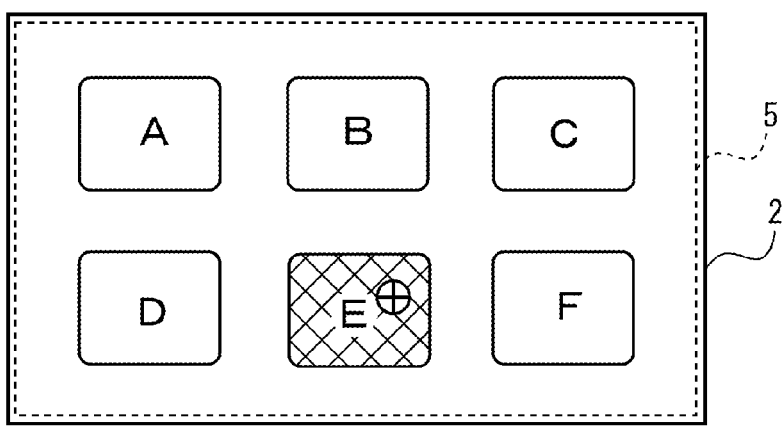
FIG. 23C is an explanatory diagram showing an example of rear surface input operations by a user using a finger of each hand.
Figure 24:
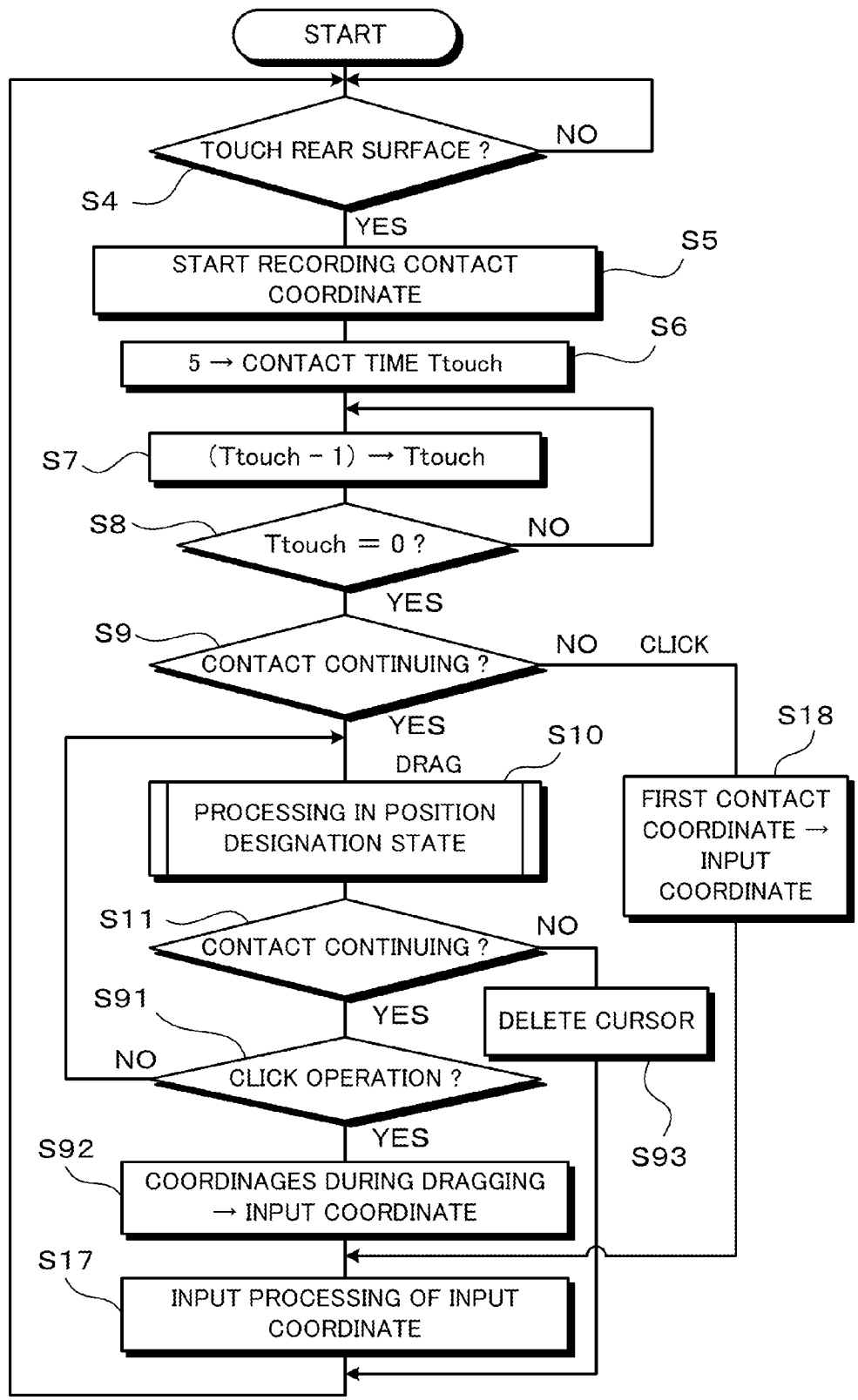
FIG. 24 is a flowchart showing other examples of operations of the game device.

As shown in FIG. 23A, if the user touches the rear surface touch panel 5 with a finger 8 of one hand (in this example, the right hand) and starts the drag operation, on the display unit 2, the cursor 30 reflecting the position of the finger is displayed, and the position designation state applies. Thereupon, as shown in FIG. 23B, the user touches the rear surface touch panel 5 with the finger 8 of the right hand, and keeping the contact, drags the finger to a destination position (in this example, a position corresponding to the button E). Thereby, as the dragging reaches the destination position, without removing the right-hand finger 8 from the rear surface touch panel 5, with the finger 8' of the other hand (the left hand), the user performs a click operation on the rear surface touch panel 5. Thereby, as shown in FIG. 23C, the position of the cursor 30, which is in the process of dragging, at the point of the click operation made by the lefthand finger 8', is determined as the input position; then the button E is selected and entered. Thus, by clicking the rear surface touch panel 5 while dragging a finger of the other hand, the rear surface input with a precise position designation is realized.

Figure 22:
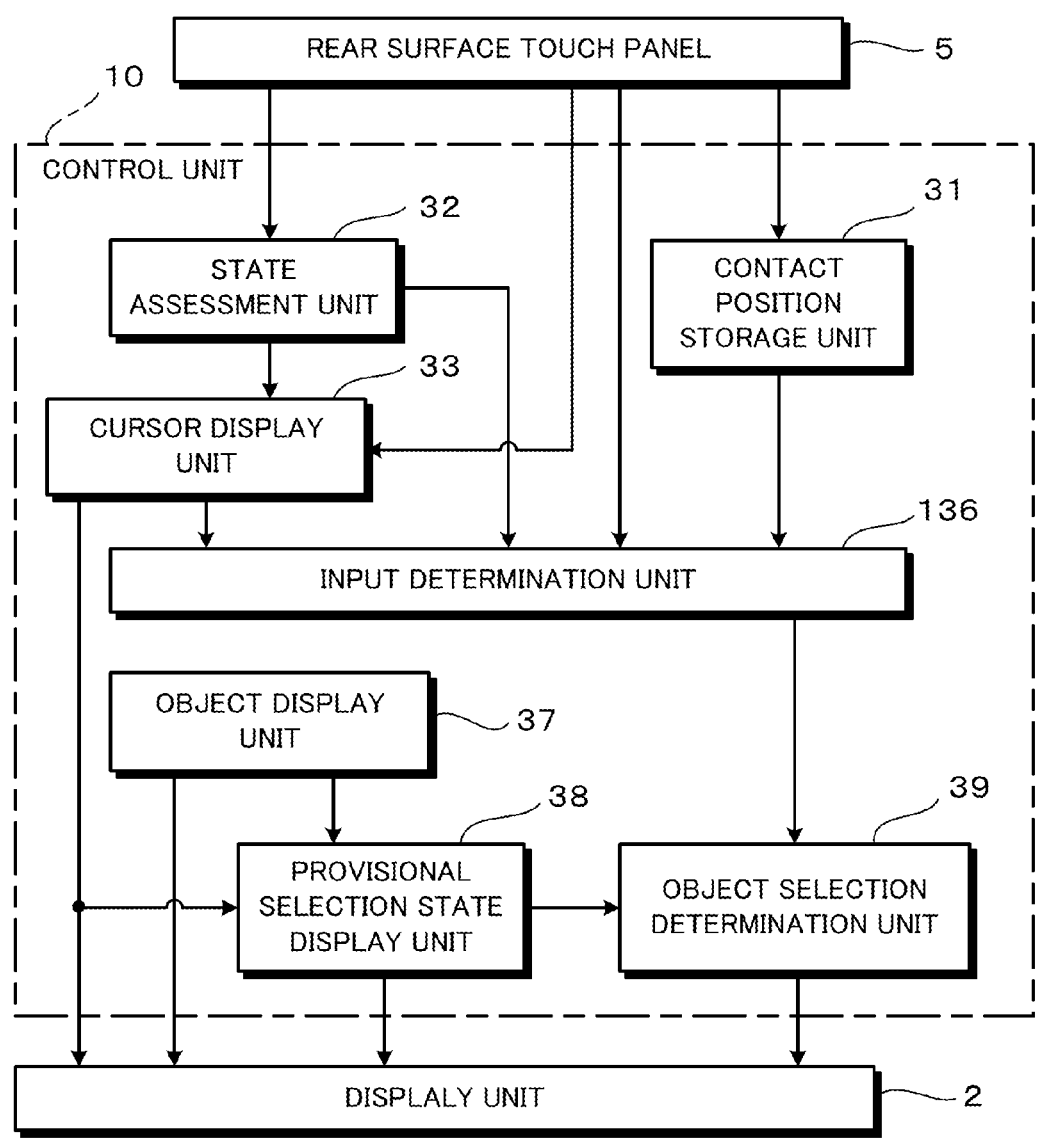
FIG. 22 is a functional block diagram showing other examples of functional configurations of the game device.

As shown in FIG. 22, the game device 1 which realizes the above rear surface input operation comprises the contact position storage unit 31, the state assessment unit 32, the cursor display unit (index display unit) 33, an input determination unit 136, the object display unit 37, the provisional selection state display unit 38 and the object selection determination unit 39, the respective units to be realized by the control unit 10 executing the program.

The input determination unit 136 has a function of determining the position of the cursor 30 as the input position, when by drag operations during the position designation state a prescribed operation (in this embodiment, a click operation) is made by contact of the contact object subjected to an point in the entire area of the rear surface touch panel 5.

Moreover, when a state is detected wherein the contact object such as a finger is removed without transiting to position designation state, the input determination unit 136 determines as the input position, the coordinate of the contact position when the finger (contact object) contacts the rear surface touch panel 5, stored in the contact position storage unit 31. In other words, when a click operation as a one-touch rear surface input operation is made, the input determination unit 136 determines, as the input position, the coordinate of the contact position at the point when the finger touched the rear surface touch panel 5.

In the present game device 1, it is possible to make input determinations without removing the finger, in the course of dragging, from the rear surface touch panel 5. Thereby, the provisionally determined position storage unit 34 and the effective interval setting unit 35, which are necessary in the game device shown in FIG. 4, can be omitted. Alternatively, as for the other configurations (the units 31 to 33 and 37 to 39) than the input determination unit 136 of the present game device 1, they are basically configured in the same manner as the game device shown in FIG. 4.

Subsequently, an operational example of the game device 1 is now explained with reference to the flowchart of FIG. 24.

In the present game device 1, the position designation (drag operation) and the input determination (click operation) are performed simultaneously. Thus, the foregoing effective interval of provisional determination needs not be set. Therefore, the processing of S1 to S3 and so on in the flowchart of FIG. 8 can be omitted. Alternatively, as for S4 to S11, the processing is basically performed in the same manner as explained in the flowchart of FIG. 8.

Here, the case where a user has performed a drag operation is considered. After the contact of the finger with the rear surface touch panel 5 (S4: YES), the routine goes through S5 to S7. When $T_{touch}$ reaches 0 (S8: YES), the finger in the state of dragging is in contact with the rear surface touch panel 5 (S9: YES). Thereby, it is assessed that the position designation state applies, and the routine proceeds to the position designation state process (S10). Thereafter, in the course of dragging wherein the contact of the finger with the rear surface touch panel 5 continues (S11: YES), when a click operation is made at an arbitrary position on the rear surface touch panel 5 (S91: YES), the position coordinate of the cursor 30, in the course of dragging, at the point of the foregoing click operation is determined as the input coordinate (S92). Subsequently, the input processing of the input coordinate is executed (S17).

Alternatively, considered is the case where the user in drag operation with the aim of position designation removes the finger from the rear surface touch panel 5 without performing a click operation, thereby discontinuing position designation. In this case, when the finger is removed from the rear surface touch panel 5 and the contact is cancelled (S11: NO), the cursor display unit 33 deletes the cursor 30 from the display unit 2 (S93), thereby the position designation state is cancelled.

Moreover, considered is the case where a one-touch rear surface input is made by a click operation, without any drag operation. In this case, after the finger comes in contact with the rear surface touch panel 5 (S4: YES), the routine goes through S5 to S7. When the contact time $T_{touch}$ reaches 0 (S8: YES), as the finger is removed from the rear surface touch panel 5 (S9: NO), the routine proceeds to S18. Here in S18, the first contact coordinate stored in the above S5 (in other words, the coordinate of the click position when contact was made with the rear surface touch panel 5) is determined as the input coordinate (S18). Subsequently, the input processing of the input coordinate is executed (S17).

After S17 or S93, the routine proceeds to S4 again; while the game device 1 receives the rear surface input, the processing described above is repeated.

In the present game device 1, the position designation of an input coordinate is made by the drag operation, whereas the click operation is an operation to confirm the intention of input determination. Thus, by separating the roles of the two operations, precise coordinate designation at the point of a click operation as a regular one-touch input operation becomes unnecessary.

As described above, the game device 1 according to the present embodiment is a game device (portable type device) having the display unit 2 and the rear surface touch panel 5 (a touch-input style rear surface input unit) which is disposed on the surface opposite the installation surface of the display unit 2, comprising: (1) the state assessment unit 32 which assesses that a position designation state is applied when detecting a state in which a contact object such as a finger and the like is kept contacting the rear surface touch panel 5 in a prescribed time or longer, or a state in which the contact object moves while maintaining contact with the rear surface touch panel 5; (2) the cursor display unit 33 (index display unit) for displaying a cursor 30 on the display unit 2, the cursor 30 corresponding to a position of the contact object which is in contact with the rear surface touch panel 5 or which moves while contacting the rear surface touch panel 5; and (3) the input determination unit 136 which makes a definite determination of an input at the provisionally determined position stored in the provisionally determined position storage unit based on a definite determination operation being prescribed (a click operation and the like) by a contact of the contact object to be made, the definite determination operation being subjected to an entire surface of the rear surface touch panel 5.

According to this configuration, the present game device 1, even when used under circumstances in cars and during walking, where oscillation, hand giggling and the like easily occur, with the user having only to have a finger contact an arbitrary position on the rear surface touch panel 5, to drag the finger maintaining the contact state, to carefully make the finger reach the destination position (the position of an object such as a button) visually recognizing the cursor 30 on the display unit 2, and at that position to remove the finger, thereby determining the input at the position, averts erroneous operations such as pushing an unintended button, and realizes accurate rear surface input.

Moreover, the present game device 1 comprises the contact position storage unit 31, which stores the contact position where a contact object touches the rear surface touch panel 5 in the recording device (RAM 13 and the like), and the foregoing input determination unit 136 is configured to determine the contact position stored in the contact position storage unit 31 as the input position, when a state is detected wherein the contact object is removed from the rear surface touch panel 5 without transiting to the position designation state.

According to this configuration, not only operations of making input determination by clicking while in the course of dragging, after careful position designation by drag operation, but also regular one-touch input operation is possible. The user can flexibly use these two respective operations of rear surface input, depending on the circumstances and environment where the game device 1 is used.

Incidentally, not only (1) the operation of input determination by clicking in the course of dragging and (2) the regular one-touch input operation, but also (3) the foregoing operation of making provisional determination by removing the dragged finger from the rear surface touch panel 5, and of making definite determination by clicking can be realized in parallel; it can be so configured that the user can flexibly use these three operations of rear surface input. This configuration can be realized, basically by applying the functional configuration of the control unit 10 as shown in FIG. 4 and FIG. 17, and by providing the input determination unit 36 of the control unit 10 with the function of the input determination unit 136 in FIG. 22. The operational example according to this configuration is shown in the flowchart of FIG. 25.

Figure 25:
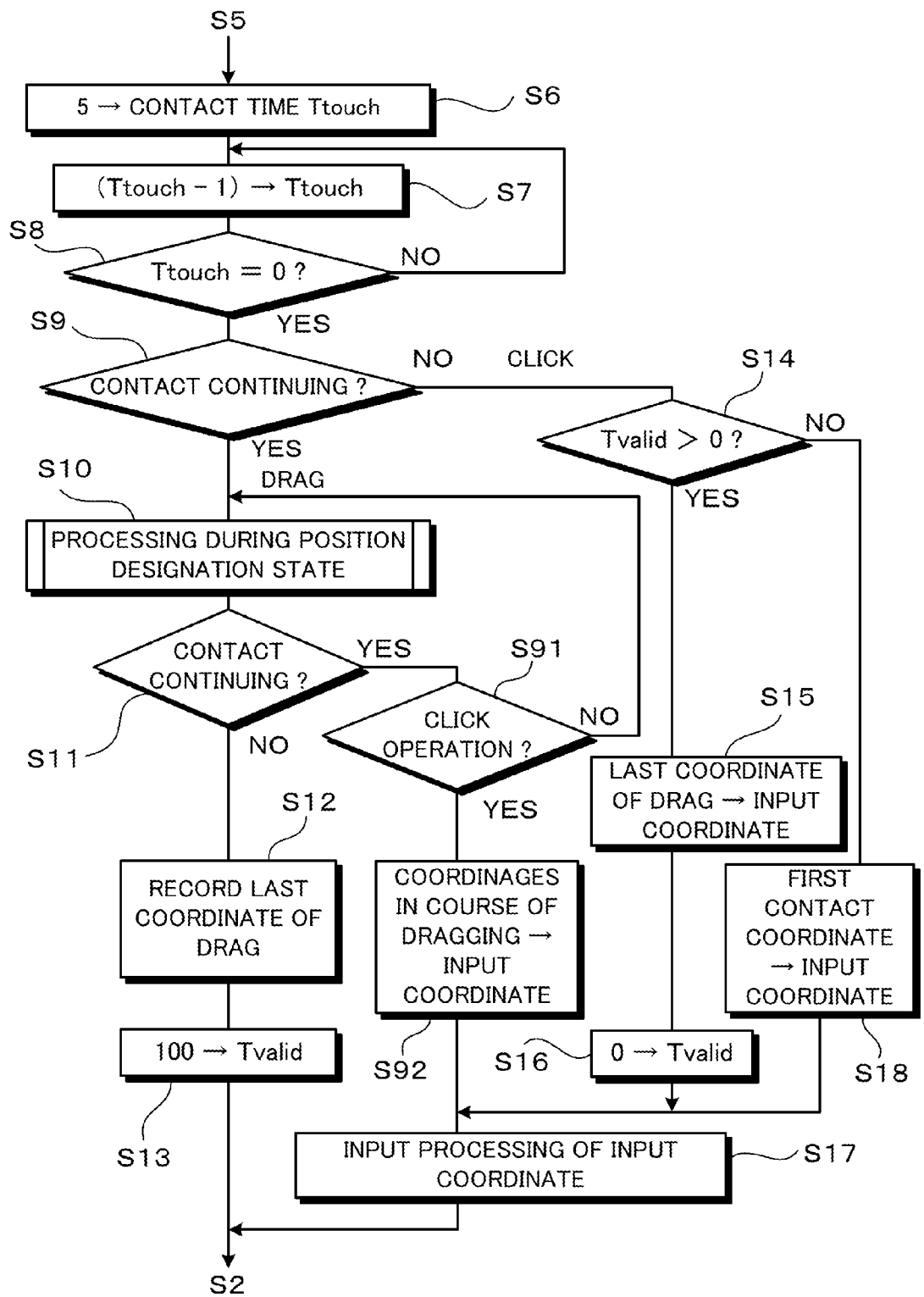
FIG. 25 is a flowchart showing other examples of operations of the game device.

The flowchart of FIG. 25 is the processing of S6 onward in the basic flowchart of FIG. 8 partially altered. Descriptions of the steps S1 to S5 are omitted for the sake of simplicity; however, these steps S1 to S5 are included in the routine.

In FIG. 25, when the user performs the drag operation on the rear surface touch panel 5 (S9; YES), it is assessed that the position designation state applies, and the routine proceeds to the processing of the position designation state (S10). Here, while the drag operation continues (S11: YES), when the user performs a click operation on the rear surface touch panel 5 (S91: YES), the position coordinate of the dragging cursor 30 at the point of the click operation is determined as the input coordinate (S92). Meanwhile, when the user performs the provisional determination operation (S11: NO), the last coordinate of the dragging is stored as a provisionally determined position (S12); thereby, as the effective interval $T_{valid}$ for the provisionally determined position, the prescribed value (100) is set (S13).

Alternatively, when the user performs a click operation on the rear surface touch panel 5 (S9: NO), if the operation is a click operation before the effective interval $T_{valid}$ reaches 0 (S14: YES), the last coordinate of dragging, which is stored as the provisionally determined position, is definitely determined (S15), and the effective interval $T_{valid}$ is initialized (S16). Meanwhile, if the operation is a click operation when the effective interval $T_{valid}$ is 0 (S14: NO), the first contact coordinate of clicking is determined as the input coordinate (S18).

Thus, depending on the different operations the user performs, whichever process from among S92, S15 or S18 is executed and the input coordinate is determined, thereby the input processing of the determined input coordinate is executed (S17). Additionally, after S17 or S13, the routine again proceeds to S2 (refer to FIG. 8), and while the game device 1 receives rear surface input, the processing described above is repeated.

[Another Embodiment]

Figure 26A:
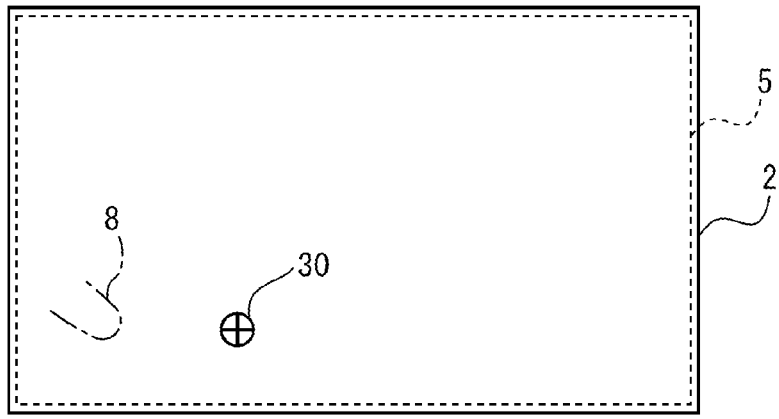
FIG. 26A is an explanatory diagram showing an example of relative displacement operations of a cursor positioned away from the finger.
Figure 26B:
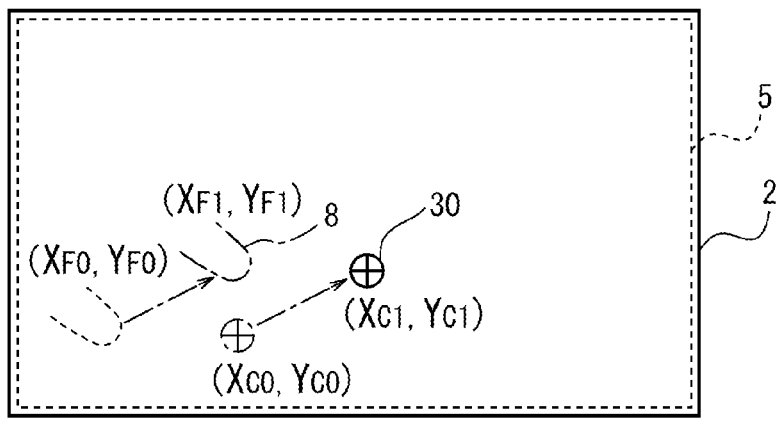
FIG. 26B is an explanatory diagram showing an example of relative displacement operations of a cursor positioned away from the finger.
Figure 26C:
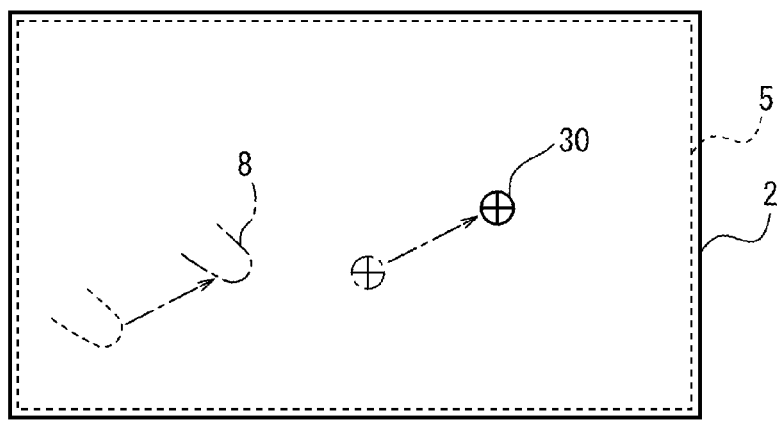
FIG. 26C is an explanatory diagram showing an example of relative displacement operations of a cursor positioned away from the finger.

In each embodiment described above, explanations have been given of examples where the contact position (absolute position) that the finger is in contact with the rear surface touch panel 5 and the display position (absolute position) of the cursor 30 on the display unit 2 are in one-to-one correspondence (in other words, the position of the finger on the rear surface and the position of the cursor 30 on the front surface coincide). Meanwhile, as illustrated in FIG. 26A to FIG. 26C, it can be so configured that even when the finger 8 and the cursor 30 are in a separate status (the state where the coordinates of the finger 8 and of the cursor 30 are different), if the finger 8 is transported (dragged) at an arbitrary position on the rear surface touch panel, the cursor 30 transports, while maintaining the relative positional relationship between the finger 8 and the cursor 30, depending on the transport direction and the transport distance of the finger 8. The operation of FIG. 26A to FIG. 26C is now explained in detail.

FIG. 26A shows the cursor 30, at the point of removal of the finger 8, which was in the dragging operation for provisional determination, from the rear surface touch panel 5. By the removal of the finger 8 from the rear surface touch panel 5, a provisional determination is tentatively made at the position of the cursor. Still, within the effective interval for provisional determination, the position designation state continues. Thereby, within the effective interval, if the finger 8 comes in contact with an arbitrary position on the rear surface touch panel 5, as shown in FIG. 26B, and the drag operation is resumed again, while maintaining the relative positional relationship between the finger 8 and the cursor 30, the cursor 30 can be transported according to the direction and the amount of the transport.

For example, let it be assumed that the starting coordinate (the contact coordinate of the finger 8 at the start of dragging) in FIG. 26B is $(X_{F0}, Y_{F0})=(50, 100)$, and that the coordinate of the cursor 30 at the time the dragging starts is $(X_{C0}, Y_{C0})=(200, 100)$. Subsequently, when it is assumed that the ending coordinate (the coordinate at the time the dragging finger is removed from the rear surface touch panel 5) is $(X_{F1}, Y_{F1})=(200, 200)$, the coordinate of the cursor 30 at the time the dragging ends is $(X_{C1}, Y_{C1})=(X_{C0}+X_{F1}-X_{F0}, Y_{C0}+Y_{F1}-Y_{F0})=(350, 200)$; whereby the relative positional relationship between the finger 8 and the cursor 30 is retained at the start and the end of the drag operation. During the drag operation as well, the relative positional relationship between the finger 8 and the cursor 30 is the same.

In the FIG. 26B, when the dragging finger 8 is removed from the rear surface touch panel 5 at the position of the cursor 30, a provisional determination is made again at the foregoing cursor position. Furthermore, during the effective interval for provisional determination, if the finger 8 touches at an arbitrary position on the rear surface touch panel 5, as shown in FIG. 26C, and starts the drag operation again, while maintaining the relative positional relation between the finger 8 and the cursor 30, the cursor 30 can be moved more, depending on the movement direction and the movement distance of the finger 8. Thereafter, even when the finger 8 and the cursor 30 are apart, by moving the cursor 30 relatively, the provisionally determined position can be adjusted. Note that, as described above, with the lapse of the provisional determination effective interval, the cursor 30 is deleted.

To realize the operation described above, the cursor display unit 33 of the game device 1, in a position designation state for provisional determination, corresponding to the directions and the distance of the movement of the contact object such as a finger or the like which moves in contact with the rear surface touch panel 5, displays the cursor 30 on the display unit 2, so that the cursor 30 moves while maintaining the relative positional relationship between the contact object and the cursor.

Consequently, even when the finger cannot reach the whole rear surface touch panel 5, it becomes possible to move the cursor 30 which is displayed on the display unit 2 to any part of the whole screen.

Note that when it is to be configured that, as described above, even if the finger 8 and the cursor 30 are apart, the cursor 30 can be relatively transported on the basis of the relative positional relationship of the finger 8 and the cursor 30, it is possible to always note on the display unit 2, the cursor 30 for the purpose of designating the provisional determination position, and to ensure the cursor 30 is not deleted at the elapse of the effective interval. However, if the cursor 30 is always displayed on the display unit 2, whether the current device condition is in a position designation state or not is difficult to perceive. Preferably, therefore, the cursor 30 is displayed only during the position designation state and during the effective interval for a provisional determination.

Moreover, in the above embodiment, an example is explained, of designating a click operation as the definite determination operation after the provisional determination. However, a definite determination operation is not limited to this example; it has only to be an operation by a contact of the contact object with any part of the entire surface of the rear surface touch panel 5. For example, double clicking, which is two prompt click operations on the rear surface touch panel 5; swiping, which is a sweeping-like movement of the finger on the rear surface touch panel 5 and clicking on the rear surface touch panel 5 with two (or more) fingers, and so on can be configured as a definite determination operation.

It is more desirable, however, in terms of operability, to make a definite determination operation of a click operation, which is the simplest operation. When the definite determination operation is configured as a click operation, the operation is the same as a one-touch click operation of rear surface input; nevertheless, as described above, by judging whether the effective interval for provisional determination remains or not (refer to S14 of FIG. 8), it is possible to easily distinguish the two click operations. Note that when a definite determination operation and an operation of one-touch rear surface input are configured as different operations, without passing judgment based on the effective interval for provisional determination, it is possible to distinguish both operations.

In the embodiment described above, in the position designation state, a provisional determination is made at the position where the finger is removed from the rear surface touch panel 5, whereas it can also be configured that the input is confirmed at the position where the finger is removed. In this case, the user has only to have a finger contact an arbitrary position on the rear surface touch panel 5, to move the finger maintaining the contact, visually recognizing the cursor 30 on the display unit 2, to carefully make the finger reach the destination position (the position of an object such as a button), and at that position to remove the finger, with which the input into that position is confirmed, thereby curtailing the definite determination operation. Note that the configuration explained in the embodiment above is more preferable, of first making a provisional determination of the position where the finger is removed, and then make a definite determination operation, so that if in a position designation state, the finger is removed from the rear surface touch panel 5 at a different position than the determination position, the input at the position is cancelled without being confirmed.

Moreover, in the embodiment described above, the rear surface input operation in selecting and entering a button displayed on the display unit 2 is mainly explained; whereas, in the operations of designating the position (coordinate) itself on the screen to be input, the present invention can be opportunely employed. For example, on the screen of a baseball game, when the user designates a position (coordinate) on the screen to be input with rear surface operation, in order to designate the pitching course (the trajectory of the ball object) of the pitcher character in pitching toward the batter character, the application of the present invention enables designation of the precise pitching course, without being affected by hand giggling and the like.

Moreover, in the embodiment described above, the game device using rear surface input system is illustrated and explained as the portable device; whereas, the present invention should not be limited to this example. Specifically, the present invention is applicable to portable terminals adopting rear surface input system, such as smart phones, mobile phones, Personal Handyphone System (PHS) and the like, and the entirety of portable devices including tablet computers. Portable devices are often used on the train or on foot; when portable devices are used even in such environment where hand gigging and the like are likely to arise, by applying the present invention; accurate rear surface input operations are made possible.

Moreover, the present invention can be applied to input devices and game controllers which adopt the rear surface input system, used with cable connection or wireless connection, connected to personal computers and to stationary game devices.

The computer-readable program according to this embodiment is recorded in respective recording media such as a hard disk, an optical disk (CD-ROM, DVD-ROM and the like), a flexible disk, a semiconductor memory, a ROM cassette, and a cartridge for the video game device and so on, to be read from the storage media and to be executed by the control unit 10 of the game device 1. Alternatively, the program is first recorded by a ROM 12, to be read from the ROM 12 and to be executed by the control unit 10 of the game device 1. Moreover, the means to provide the game device 1 with the program is not limited to the foregoing recording media but can be through communication network of internet and the like. For example, if the program is downloadable through internet from homepages and the like of network game managing companies, it can be so configured that the program is downloaded directly from the foregoing homepages directly onto the game device 1 to be executed.

[Summary of Embodiment]

(1) A portable device according to one aspect of the present invention is a portable device provided with a display unit and a rear surface input unit of a touch-input type disposed on a surface opposite an installation surface of the display unit, comprising: a state assessment unit which assesses that a position designation state is applied when detecting a state in which a contact object is kept contacting the rear surface input unit in a prescribed time or longer, or a state in which the contact object moves while maintaining contact with the rear surface input unit; an index display unit for displaying an index on the display unit, the index corresponding to a position of the contact object which is in contact with the rear surface input unit or which moves while contacting the rear surface input unit; a provisionally determined position storage unit for storing in a storage device, a position of the index at a time when the contact object is removed from the rear surface input unit as a provisionally determined position; and an input determination unit which makes a definite determination of an input at the provisionally determined position stored in the provisionally determined position storage unit based on a definite determination operation being prescribed by a contact of the contact object, the definite determination operation being subjected to an entire surface of the rear surface input unit.

According to the foregoing configuration, the portable device (for example, a portable game device, a portable terminal and the like) allows rear surface input operations with a contact object such as the user's finger touching a touch input style rear input unit (for example, touch panel) that is disposed on a surface opposite the installation surface of a display unit. Concerning the rear surface input operations, in this configuration, inputting is enabled with a two-step operation comprising: (A) a position designation operation to designate a provisionally determined position and (B) a definite determination operation to make a definite determination of an input at a provisionally determined position.

The foregoing position designation operation of (A) is not a conventional one-touch input operation on a touch panel, wherein a contact object such as a finger, touches the rear surface input unit and immediately is removed from the rear surface input unit; instead, it is an operation of having a contact object first contact somewhere on the rear surface input unit, of moving the contact object to a destination position (a position where a button or the like is displayed) while keeping the contact, and of removing that contact object at the destination position from the rear surface input unit. When the position designation operation is started by the user, the state assessment unit assesses that a position designation state applies. The assessment that the position designation applies is made (a) if a state is detected wherein a contact object is kept contacting the rear surface input unit in a prescribed time or longer, or (b) if it is detected that the contact object moves while maintaining contact with the rear surface input unit. In other words, since a position designation operation is an operation to transport the contact object carefully, with its contact with the rear surface input unit maintained, to a destination position over a certain amount of time, it can be assessed that a position designation operation has started (that is, a position designation state applies) by detecting either of the foregoing states (a) or (b).

Moreover, it is configured that in a position designation state, the index display unit displays on the display unit an index (for example, a cursor) corresponding to the position of the contact object which is or moves in contact with the rear surface input unit. Thus, in the position designation state, an index is displayed on the screen of the display unit, the index reflecting the position of the contact object such as a finger which is in contact with the rear surface input unit, thus enabling the user to perform rear surface operations visually recognizing the index coordinating with the movement of the contact object. Thereby, position designation by accurate rear surface operation is made possible, incurring no rise of manufacturing cost by complication and the like of the device, such as by parallel use of a camera or other sensors other than touch panels, transparency of device or addition of protrusion.

Moreover, in this position designation state, if the user removes the contact object such as a finger from the rear surface input unit, the position of the index at the time when that contact object is removed from the rear surface input unit is stored as a provisionally determined position by the provisionally determined position storage unit, which concludes the provisional determination. Specifically, unlike one-touch operations in the case of conventional touch panels where the timing of the contact with the screen triggers the processing, the timing of the cancellation of contact serves as the trigger. At this stage, however, the determination is only provisional, as stated above. In this way, a provisional determination is set at the time of removal of the contact object, thereby erroneous operations can be limited to extremely few. The reason is as follows: in the case of conventional touch panel input operations, naturally, the contact object (a finger or a pen) is brought toward the intended button and the like as the target, from a location away from the screen; however, since there is some distance between the button and the contact object, before the contact object eventually comes in contact with the screen, there is a possibility of the contact position deviating from the intended button, and of the contact object reaching a wrong button. Especially, portable devices are often operated on board and on foot, in which case position deviation is more likely, caused by shaking, hand giggling and so on. In addition, the rear surface input poses a higher challenge level of operability, which makes the operation of bringing the contact object to the intended button becomes even more difficult. On the other hand, in this configuration, a finger, for example, is first made to contact the intended button, and at the timing of removing the finger, the button is confirmed (provisionally determined); there can be no consequences from oscillation or hand giggling, and the risk of pushing an unintended button is averted.

Subsequently, the definite determination operation of the foregoing (B) which is performed after a provisional determination is a prescribed operation by the contact of a contact object with any part of the entire surface of the rear surface input unit. One example that can be deemed as a definite determination operation is a so-called click or tap operation, which is to have the contact object contact an arbitrary position of the rear surface input unit and to quickly cancel the contact state. When the user performs this definite determination operation, the input determination unit makes the definite determination of an input at a provisionally determined position which is stored in the provisionally determined position storage unit.

As described above, according to the foregoing configuration, the user has only to have a contact object such as a finger contact an arbitrary position on the rear surface input unit, to move the contact object maintaining the contact to carefully make the contact object reach a destination position (the position where a button or the like is displayed), visually recognizing the index on the display unit, and at that position to remove the contact object from the rear surface input unit; thereby, that position is provisionally determined. Thus, erroneous operations such as pushing an unintended button can be averted, and accurate rear surface input can be realized.

(2) In the foregoing configuration, preferably, a contact position storage unit for storing a contact position of the contact object at a time when the contact object comes in contact with the rear surface input unit, wherein the input determination unit determines as an input position, the contact position stored in the contact position storage unit, when detecting that the contact object is removed from the rear surface input unit without making a transition to the position designation state.

According to the foregoing configuration, not only the two-stage operation described above of the position designation operation for provisional determination and of the definite determination, but also a rear surface one-touch (one-click) operation to the rear surface input unit is made possible. This one-touch (one-click) operation is, in short, similar to one-touch operation input in conventional touch panels. This operation as well is made available, in order to enable the user to operate and to input to their discretion and according to the usage situation (environment) surrounding the user and the portable device, thereby ensuring degrees of freedom in operability. The foregoing configuration (1) is a very useful configuration when the portable device is used on board or on foot, for example. However, depending on the user, for the reason of being confident or well-accustomed to rear surface input operations, the two-stage input operation may be felt troublesome. Alternatively, in the case of playing at a desk, it is also imaginable that there is less possibility of erroneous operations. Thus, in the present configuration, the same device is still equipped with arbitrarily selectable input operation methods in answer to different users and situations, which can realize excellent operability.

The foregoing configuration is now explained including specific parts. This one-touch operation rear surface input is realized by a contact position storage unit storing the contact position of the contact object at the time when the contact object touched the rear surface input unit, and also by a input determination unit determining as the input position the contact position stored in the contact position storage unit, at the time when it is detected that the contact object is removed from the rear surface input unit without transiting to a position designation state.

Specifically, the foregoing situation where the contact object has been removed from the rear surface input unit without making a transition to the position designation state unit indicates the situation where the contact object, "without being in contact with the rear surface input unit for a prescribed time or longer" or "without being moved while contacting the rear surface input unit" has been removed from the rear surface input unit. In other words, the foregoing situation indicates the situation where a one-touch operation has been made by the user with respect to the rear surface input unit. Therefore, when it is detected that the contact object is removed from the rear surface input unit without making a transition to a position designation state, it is deemed that a one-touch operation has been made as a different operation from the foregoing two-stage operation, and the contact position stored in the contact position storage unit is determined as the input position.

With the present configuration, not only a two-stage operation of position designation operation and of definite determination, but also a regular one-touch input operation is made possible. Therefore, for example, under circumstances where hand giggling and the like is prone to happen, or when a relatively small button is displayed on the display unit, the foregoing two-stage operation can be performed; when in the display unit a relatively large button is displayed, a regular one-touch operation can be made. Likewise, the user can use flexibly these two rear surface input operations in answer to each situation and environment of device usage.

(3) In the foregoing configuration, preferably, an effective interval setting unit for setting an effective interval from a time when the provisionally determined position is stored by the provisionally determined position storage unit to a time when the provisionally determined position is definitely determined, wherein the input determination unit makes the definite determination of the input at the provisionally determined position only when the definite determination operation is made in the effective interval set by the effective interval setting unit; and the index display unit deletes the index on the display unit, when the definite determination operation is not made within the effective interval.

According to the foregoing configuration, when a provisionally determined position is stored by the provisionally determined position storage unit and a provisional determination is made, an effective interval is set for that provisional determination. Subsequently, only when a definite determination operation is made within the effective interval, the provisionally determined position is definitely determined. Meanwhile, when a definite determination is not made within the effective interval, the index is deleted from the display unit. Thereby, with the passage of the effective interval, the index is automatically deleted from the display unit, and the provisional determination is cancelled. Thus, if the user wishes to cancel a provisionally determined position after making the provisional determination operation, the user has only to wait for the effective interval to pass, without having to make any specific cancellation operation. Alternatively, when the user notices that a wrong provisional determination has been made and wishes to re-enter, upon deletion of the index, the user can make an input operation anew. Therefore, judging when to re-enter is easy, and operability is improved.

(4) In the foregoing configuration, preferably, the index display unit comprises an index display state change unit which reduces a visibility of a display state of the index as a remaining time of the effective interval becomes shorter.

Thus, by bringing in changes to lower the visibility of the display state of the index (for example, reducing the display area of the index, or raising the transparency of the area) as the remaining time of the effective interval set for a provisional determination becomes shorter, the user can be notified explicitly that the remaining time of the effective interval is diminishing. In addition, the deletion of the index at the conclusion of the effective interval can be made naturally. Especially because the user makes operations of a provisional determination and of the consequent definite determination as a user visually recognizes the index on the display unit, by changing the display state of the index as described above, the remaining time of an effective interval can be effectively recognized by the user.

(5) The foregoing configuration, preferably, further comprises an effective area setting unit for setting an effective area being prescribed on the rear surface input unit, the effective area including a position of the contact object when removing the contact object in the position designation state from the rear surface input unit, wherein the input determination unit makes the definite determination of an input at the provisionally determined position only when the definite determination operation is made in within the effective area set by the effective area setting unit.

According to the foregoing configuration, when in a position designation state the user removes the contact object such as a finger from the rear surface input unit to make a provisional determination operation, a prescribed effective area including the position where the contact object was removed is to be set on the rear surface input unit. Additionally, only when the definite determination operation is made within the effective area on the rear surface input unit, the provisionally determined position is definitely determined. Therefore, since an operation on the rear surface input unit that is made outside the effective area is not deemed as the definite determination operation, other arbitrary operations than a definite determination operation can be received outside the effective area, even after a provisional determination is made.

As an example of operations outside the effective area after a provisional determination, given is a cancellation operation, of a provisional determination after the determination is made. For example, if a cancellation button is displayed on the display unit, the button of a feasible size as to easily make one-touch rear surface input, then, after a provisional determination, by making one-touch rear surface input of that cancellation button which is disposed outside the effective area, a provisional determinations once set can be immediately cancelled, any time without waiting for the effective interval to pass. Thereby, a configuration to perform swift processing operations can be provided.

(6) The foregoing configuration, preferably, further comprises an object display unit for displaying a selectable object on the display unit; a provisional selection state display unit which displays the selectable object in a provisional selection state when the index overlaps the selectable object displayed on the display unit, the provisional selection state being a different display state from a display state when a provisional selection is determined; and an object selection determination unit for determining the provisional selection of the selectable object when the input is definitely determined by the input determination unit in a state the selectable object is displayed in the provisional selection state.

According to the foregoing configuration, at the point of position designation for provisional determination, when one of selectable objects (for example, buttons, icons, characters or other objects to select from) and the index overlap, that selectable object is displayed in a provisional selection state, which is different (for example, different in color, brightness and pattern) from the display state at the time when the provisional selection is confirmed. Subsequently, the selectable object displayed in the provisional selection state can be selected and confirmed by a definite determination operation.

Thus, in a position designation state, not only by displaying the index on the screen of the display unit reflecting the contact position of the contact object with the rear surface input unit, but also by exhibiting visually explicitly to the user that the object overlapping that index is in the provisional selection state, further enhancement of operability can be pursued.

(7) The foregoing configuration, preferably, further comprises an object display unit for displaying one or more selectable objects on the display unit; a provisional selection state display unit which displays the one or more selectable objects located in an area enclosed by a trajectory of the index in a provisional selection state which is different from a display state of displaying the selective objects when a provisional selection is determined, the index being moved as the contact object in contact with the rear surface input unit moves; and an object selection determination unit for determining the provisional selection of the one or more selectable objects when the input is definitely determined by the input determination unit in a state the one or more selectable objects are displayed in the provisional selection state.

Figure 15B:
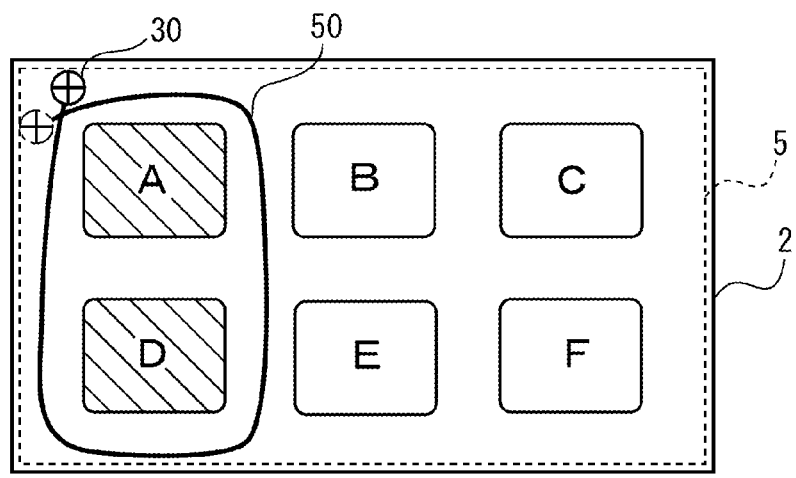
FIG. 15B is an explanatory diagram showing another example of operations to set a plurality of provisionally determined positions.
Figure 15C:
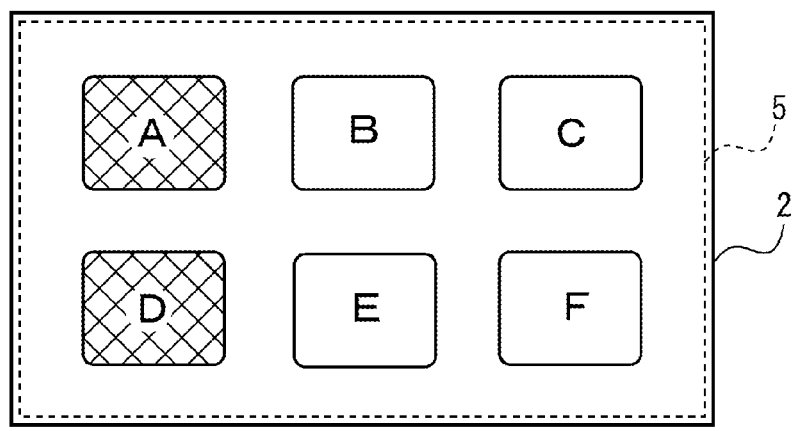
FIG. 15C is an explanatory diagram showing another example of operations to set a plurality of provisionally determined positions.

According to the foregoing configuration, in the position designation state, it becomes possible to apply the provisional selection state collectively to one or more objects that exist in an area encircled by the trajectories of the index, which move with the movement of the finger and the like in contact with the rear surface input unit (FIG. 15B). The objects thus provisionally selected in a bundle can be collectively confirmed by the definite determination operation. By enabling these operations of bundle provisional selection and bundle definite determination, which utilize the trajectory of the index, the operability in selecting plural objects is greatly enhanced.

For example, on the screen of a baseball game, in such operations as collectively selecting the three outfielder characters and shifting them (have their positions moved from ordinary to advanced,) the operations of bundle provisional determination and bundle definite determination can be opportunely used.

(8) The foregoing configuration, preferably, comprises a continuous-input-capable object display unit for displaying on the display unit, a continuous-input-capable object which continuously admits the definite determination of the input made at the provisionally determined position being a same position; and an effective interval resetting unit which resets after the definite determination by the input determination unit, the effective interval for the provisionally determined position when the definite determination operation is made within the effective interval in a state where the provisionally determined position exists within a display range of the continuous-input-capable object, and which starts the effective interval reset from a beginning, wherein when the definite determination operation is performed in the effective interval reset by the effective interval resetting unit, the input determination unit makes the definite determination of the input at the provisionally determined position again.

Here, as an example of continuous-input-capable objects, given are counting up and counting down buttons and the like, to alter a changeable number (parameter) by one more or less each time it is pushed (refer to ▲▼ buttons of FIG. 20 A to FIG. 20 C). When counting up and counting down buttons are used to set an arbitrary number, the same button will be entered many times in sequence. Therefore, in the present configuration, it is so configured that, when a provisional determination is made within the display range of the continuous-input-capable object, continuous input of definite determination can be entered of the same provisional determination position once the position is set.

In order to realize the above, in this configuration, it is so configured that after the definite determination operation is made of a provisionally determined position, an effective interval resetting unit resets an effective interval for that provisionally determined position, thereby starting that effective interval from the beginning. Moreover, at the time when the definite determination operation is performed again during the effective interval that is reset, an input determination unit once again makes a definite determination of an input at the provisionally determined position. After this definite determination, an effective interval is again reset. Therefore, as long as an effective interval lasts, the interval reset each time a definite determination is made, a continuous input of a definite determination becomes possible of the same provisionally determined position that is set one time.

Thus, concerning continuous-input-capable objects, instead of repeating provisional and definite determinations many times, one provisional determination enables a continuous input of a definite determination. As a result, improvement of operability can be pursued.

(9) In the foregoing configuration, preferably, the index display unit displays the index on the display unit in the position designation state, according to a direction and an amount of movements of the contact object which moves while contacting the rear surface input unit, so that the index moves while maintaining a relative positional relationship between the contact object and the index.

According to the foregoing configuration, even if a contact object such as a finger in contact with the rear surface input unit and the index displayed on the display unit are apart (a state wherein the contact coordinate of the contact object and the display coordinate of the index are different), if the contact object is moved on an arbitrary position on the rear surface input unit, the index can be moved, in a state where the relative positional relationship between the contact object and the index is maintained, corresponding to the direction and the distance of movement (FIG. 26A to FIG. 26C). Consequently, even when the contact object such as a finger cannot reach the whole rear surface input unit because the display unit and the rear surface input unit are large, it becomes possible to move the index which is displayed on the display unit to any part of the whole screen.

(10) A portable device according to another aspect of the present invention is a portable device provided with a display unit and a rear surface input unit of a touch-input type disposed on a surface opposite an installation surface of the display unit, comprising: a contact position storage unit for storing a contact position of a contact object at a time when the contact object comes in contact with the rear surface input unit, a state assessment unit which assesses that a position designation state is applied when detecting a state in which the contact object is kept contacting the rear surface input unit in a prescribed time or longer, or a state in which the contact object moves while maintaining contact with the rear surface input unit; an index display unit for displaying an index on the display unit, the index corresponding to a position of the contact object which is in contact with the rear surface input unit or which moves while contacting the rear surface input unit; a provisionally determined position storage unit for storing in a storage device, a position of the index at a time when the contact object is removed from the rear surface input unit as a provisionally determined position; an effective interval setting unit for setting an effective interval from a time when the provisionally determined position is stored by the provisionally determined position storage unit to a time when the provisionally determined position is definitely determined; and an input determination unit which determines the contact position stored in the contact position storage means as an input position when an operation of removing the contact object from the rear surface input unit is made after the contact object contacts the rear surface input unit in a period other than the effective interval without making a transition into the position designation state, while definitely determines the input at the provisionally determined position stored in the provisionally determined position storage unit when the operation is made within the effective interval as a definite determination operation subjected to an entire surface of the rear surface input unit.

(11) In the foregoing configuration, preferably, the provisionally determined position storage unit stores a plurality of the provisionally determined position in the storage device in a case where the transition into the position designation state has been made plural times before the definite determination operation is made within the effective interval; and in a case where the plurality of the provisionally determined position are stored in the storage device, the input determination unit definitely determines inputs at the plurality of the provisionally determined position all at once when the definite determination operation is made in the effective interval.

(12) The control method of a portable device according to another aspect of the present invention in which a computer controls the portable device provided with a display unit and a rear surface input unit of a touch-input type disposed on a surface opposite an installation surface of the display unit, the control method comprising: a state assessment step for causing the computer to assess that a position designation state applies when detecting a state in which a contact object is kept contacting the rear surface input unit in a prescribed time or longer, or a state in which the contact object moves while maintaining contact with the rear surface input unit; an index display step for causing the computer to display an index on the display unit, the index corresponding to a position of the contact object which is in contact with the rear surface input unit or which moves while contacting the rear surface input unit; a provisionally determined position storage step for causing the computer to store in a storage device, a position of the index at a time when the contact object is removed from the rear surface input unit as a provisionally determined position; and an input determination step for causing the computer to make a definite determination of an input at the provisionally determined position stored in the provisionally determined position storage step based on a definite determination operation being prescribed by a contact of the contact object, the definite determination operation being subjected to an entire surface of the rear surface input unit. Here, the computer is configured from a CPU 11, a ROM 12, a RAM 13 and so on inside the portable device.

(13) The program according to yet another aspect of the present invention is a program for causing a computer to operate as the foregoing portable device, and causes the computer to function as the respective units of the foregoing portable devise.

(14) The recording medium according to yet another aspect of the present invention is a non-transitory computer-readable recording medium having recorded thereon the program of the above (13).

Note that the embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A portable device provided with a display unit and a rear surface input unit of a touch-input type disposed on a surface opposite an installation surface of the display unit, comprising:

a state assessment unit which assesses that a position designation state is applied when detecting a state in which a contact object is kept contacting the rear surface input unit in a prescribed time or longer, or a state in which the contact object moves while maintaining contact with the rear surface input unit;

an index display unit for displaying an index on the display unit, the index corresponding to a position of the contact object which is in contact with the rear surface input unit or which moves while contacting the rear surface input unit;

a provisionally determined position storage unit for storing in a storage device, a position of the index at a time when the contact object is removed from the rear surface input unit as a provisionally determined position; and an input determination unit which makes a definite determination of an input at the provisionally determined position stored in the provisionally determined position storage unit based on a definite determination operation being prescribed by a contact of the contact object, the definite determination operation being subjected to an entire surface of the rear surface input unit.

2. The portable device according to claim 1, further comprising:

a contact position storage unit for storing a contact position of the contact object at a time when the contact object comes in contact with the rear surface input unit, wherein the input determination unit determines as an input position, the contact position stored in the contact position storage unit, when detecting that the contact object is removed from the rear surface input unit without making a transition to the position designation state.

3. The portable device according to claim 1, further comprising:

an effective interval setting unit for setting an effective interval from a time when the provisionally determined position is stored by the provisionally determined position storage unit to a time when the provisionally determined position is definitely determined, wherein the input determination unit makes the definite determination of the input at the provisionally determined position only when the definite determination operation is made within the effective interval set by the effective interval setting unit; and the index display unit deletes the index on the display unit, when the definite determination operation is not made within the effective interval.

4. The portable device according to claim 3, wherein the index display unit comprises an index display state change unit which reduces a visibility of a display state of the index as a remaining time of the effective interval becomes shorter.

5. The portable device according to claim 3, further comprising:

a continuous-input-capable object display unit for displaying on the display unit, a continuous-input-capable object which continuously admits the definite determination of the input made at the provisionally determined position being a same position; and an effective interval resetting unit which resets after the definite determination made by the input determination unit, the effective interval for the provisionally determined position when the definite determination operation is made within the effective interval in a state where the provisionally determined position exists within a display range of the continuous-input-capable object, and which starts the effective interval reset from a beginning, wherein when the definite determination operation is performed in the effective interval reset by the effective interval resetting unit, the input determination unit makes the definite determination of the input at the provisionally determined position again.

6. The portable device according to claim 1, further comprising:
an effective area setting unit for setting an effective area being prescribed on the rear surface input unit, the effective area including a position of the contact object when removing the contact object in the position designation state from the rear surface input unit,
wherein the input determination unit makes the definite determination of the input at the provisionally determined position only when the definite determination operation is made in within the effective area set by the effective area setting unit.

7. The portable device according to claim 1, further comprising:
an object display unit for displaying a selectable object on the display unit;
a provisional selection state display unit which displays the selectable object in a provisional selection state when the index overlaps the selectable object displayed on the display unit, the provisional selection state being a different display state from a display state when a provisional selection is determined; and
an object selection determination unit for determining the provisional selection of the selectable object when the input is definitely determined by the input determination unit in a state the selectable object is displayed in the provisional selection state.

8. The portable device according to claim 1, further comprising:
an object display unit for displaying one or more selectable objects on the display unit;
a provisional selection state display unit which displays the one or more selectable objects located in an area enclosed by a trajectory of the index in a provisional selection state which is different from a display state of displaying the selective objects when a provisional selection is determined, the index being moved as the contact object in contact with the rear surface input unit moves; and
an object selection determination unit for determining the provisional selection of the one or more selectable objects when the input is definitely determined by the input determination unit in a state the one or more selectable objects are displayed in the provisional selection state.

9. The portable device according to claim 1,
wherein the index display unit displays the index on the display unit in the position designation state according to a direction and an amount of movements of the contact object which moves while contacting the rear surface input unit, so that the index moves while maintaining a relative positional relationship between the contact object and the index.

10. A non-transitory computer-readable recording medium having recorded thereon a program for causing a computer to operate as the portable device according to claim 1, which causes the computer to function as respective units of the portable device.

11. A control method of a portable device in which a computer controls the portable device provided with a display unit and a rear surface input unit of a touch-input type disposed on a surface opposite an installation surface of the display unit, the control method comprising:

a state assessment step for causing the computer to assess that a position designation state applies when detecting a state in which a contact object is kept contacting the rear surface input unit in a prescribed time or longer, or a state in which the contact object moves while maintaining contact with the rear surface input unit;
an index display step for causing the computer to display an index on the display unit, the index corresponding to a position of the contact object which is in contact with the rear surface input unit or which moves while contacting the rear surface input unit;
a provisionally determined position storage step for causing the computer to store in a storage device, a position of the index at a time when the contact object is removed from the rear surface input unit as a provisionally determined position; and
an input determination step for causing the computer to make a definite determination of an input at the provisionally determined position stored in the provisionally determined position storage step based on a definite determination operation being prescribed by a contact of the contact object, the definite determination operation being subjected to an entire surface of the rear surface input unit.

12. A portable device provided with a display unit and a rear surface input unit of a touch-input type disposed on a surface opposite an installation surface of the display unit, comprising:
a contact position storage unit for storing a contact position of a contact object at a time when the contact object comes in contact with the rear surface input unit,
a state assessment unit which assesses that a position designation state is applied when detecting a state in which the contact object is kept contacting the rear surface input unit in a prescribed time or longer, or a state in which the contact object moves while maintaining contact with the rear surface input unit;
an index display unit for displaying an index on the display unit, the index corresponding to a position of the contact object which is in contact with the rear surface input unit or which moves while contacting the rear surface input unit;
a provisionally determined position storage unit for storing in a storage device, a position of the index at a time when the contact object is removed from the rear surface input unit as a provisionally determined position;
an effective interval setting unit for setting an effective interval from a time when the provisionally determined position is stored by the provisionally determined position storage unit to a time when the provisionally determined position is definitely determined; and
an input determination unit which determines the contact position stored in the contact position storage means as an input position when an operation of removing the contact object from the rear surface input unit is made after the contact object contacts the rear surface input unit in a period other than the effective interval without making a transition into the position designation state, while definitely determines the input at the provisionally determined position stored in the provisionally determined position storage unit when the operation is made within the effective interval as a definite determination operation subjected to an entire surface of the rear surface input unit.

13. The portable device according to claim 12,
wherein the provisionally determined position storage unit stores a plurality of the provisionally determined position in the storage device in a case where the transition into the position designation state has been made plural times before the definite determination operation is made within the effective interval; and in a case where the plurality of the provisionally determined position are stored in the storage device, the input determination unit definitely determines inputs at the plurality of the provisionally determined position all at once when the definite determination operation is made in the effective interval.

* * * * *